(12) United States Patent
Goto et al.

(10) Patent No.: US 8,420,581 B2
(45) Date of Patent: Apr. 16, 2013

(54) THREADED JOINT FOR PIPES HAVING A LUBRICATING COATING

(75) Inventors: Kunio Goto, Kobe (JP); Ryuichi Imai, Kainan (JP); Shigeki Fukumoto, Kakogawa (JP); Yasuhiro Yamamoto, Wakayama (JP)

(73) Assignees: Nippon Steel & Sumitomo Metal Corporation, Tokyo (JP); Vallourec Mannesmann Oil & Gas France, Aulnoye-Aymeries (FR)

( * ) Notice: Subject to any disclaimer, the term of this patent is extended or adjusted under 35 U.S.C. 154(b) by 0 days.

(21) Appl. No.: 12/771,260

(22) Filed: Apr. 30, 2010

(65) Prior Publication Data

US 2010/0264649 A1    Oct. 21, 2010

Related U.S. Application Data

(63) Continuation of application No. PCT/JP2008/069893, filed on Oct. 31, 2008.

(30) Foreign Application Priority Data

| Nov. 2, 2007 | (JP) | 2007-286507 |
| Dec. 28, 2007 | (JP) | 2007-339546 |
| Dec. 28, 2007 | (JP) | 2007-339547 |
| Oct. 17, 2008 | (JP) | 2008-268816 |

(51) Int. Cl.
*C10M 169/04* (2006.01)
*F16L 25/00* (2006.01)

(52) U.S. Cl.
USPC ........... 508/154; 508/115; 508/120; 508/122; 508/175; 508/180; 508/539; 285/333

(58) Field of Classification Search ............ 508/113, 508/154, 175, 180, 450, 451
See application file for complete search history.

(56) References Cited

U.S. PATENT DOCUMENTS

| 3,423,315 A | 1/1969 | McCarthy et al. |
| 5,049,289 A * | 9/1991 | Jacobs ................ 508/128 |

(Continued)

FOREIGN PATENT DOCUMENTS

| JP | 62-17487 | 1/1987 |
| JP | 2-47490 | 3/1990 |

(Continued)

OTHER PUBLICATIONS

T. Dohi, Journal of Japan Society of Lubrication Engineers, vol. 19, No. 10, 1974, Special Issue on Solid Lubrication (Part 1), pp. 5-6.

*Primary Examiner* — Ellen McAvoy
(74) *Attorney, Agent, or Firm* — Clark & Brody

(57) ABSTRACT

A lubricating coating which is free from harmful heavy metals is formed on a premium threaded joint for pipes constituted by a pin and a box each having a contact surface comprising a threaded portion and an unthreaded metal contact portion (a sealing surface and shoulder) in order to provide the joint with galling resistance, gas-tightness, and anticorrosive properties such that the unthreaded metal contact portion is prevented from yielding even when the joint is made up with a high torque. The lubricating coating comprises one or both of a rosin and calcium fluoride; metal soap; wax; and a basic metal salt of an aromatic organic acid, and preferably it further includes a lubricating powder, magnesium carbonate, and/or a carbohydrate, particularly a cyclodextrin.

15 Claims, 3 Drawing Sheets

U.S. PATENT DOCUMENTS

| | | | | |
|---|---|---|---|---|
| 5,180,509 | A * | 1/1993 | Jacobs | 508/126 |
| 6,350,722 | B2 * | 2/2002 | Skiles et al. | 508/115 |
| 6,827,996 | B2 * | 12/2004 | Goto | 428/36.9 |
| 6,869,111 | B2 * | 3/2005 | Goto et al. | 285/333 |
| 7,091,161 | B2 * | 8/2006 | Oldiges et al. | 508/154 |
| 7,360,798 | B2 * | 4/2008 | Matsumoto et al. | 285/94 |
| 7,723,275 | B2 * | 5/2010 | Patel et al. | 508/150 |
| 7,770,935 | B2 * | 8/2010 | Imai et al. | 285/94 |
| 7,866,706 | B2 * | 1/2011 | Goto et al. | 285/94 |
| 8,114,821 | B2 * | 2/2012 | Hajmrle et al. | 508/154 |
| 2002/0182331 | A1 * | 12/2002 | Oldiges et al. | 427/404 |
| 2004/0214732 | A1 * | 10/2004 | Oldiges et al. | 508/390 |
| 2004/0229759 | A1 | 11/2004 | Joseph et al. | |
| 2005/0187115 | A1 * | 8/2005 | Anthony et al. | 508/136 |
| 2011/0048809 | A1 * | 3/2011 | Duckworth et al. | 175/331 |
| 2011/0165331 | A1 * | 7/2011 | Barth et al. | 427/406 |

FOREIGN PATENT DOCUMENTS

| | | |
|---|---|---|
| JP | 5-125382 | 5/1993 |
| JP | 2001-65753 | 3/2001 |
| JP | 2002-173692 | 6/2002 |
| JP | 2004-53013 | 2/2004 |
| RU | 2 111 999 | 5/1998 |
| WO | 2006/104251 | 10/2006 |

* cited by examiner (a)

(b)

THREADED JOINT FOR PIPES HAVING A LUBRICATING COATING

This application is a continuation of International Patent Application No. PCT/JP2008/069893, filed Oct. 31, 2008. This PCT application was not in English as published under PCT Article 21(2).

TECHNICAL FIELD

This invention relates to a threaded joint for steel pipes for use in connecting steel pipes and particularly oil country tubular goods (OCTG), and to a surface treatment method for imparting lubricating properties. A threaded joint for pipes according to the present invention can reliably exhibit excellent galling resistance without being coated with compound grease which in the past has been applied to threaded joint for pipes when connecting oil country tubular goods. Accordingly, a threaded joint for pipes according to the present invention can avoid the harmful effects on the global environment and humans caused by compound grease. In addition, it does not readily yield even if it is tightened with a high torque thereby making it possible to realize a metal-to-metal seal easily and stably.

BACKGROUND ART

Oil country tubular goods such as tubing and casing used in the excavation of oil wells and gas wells are usually connected to each other by threaded joints for pipes. In the past, the depth of oil wells was typically 2,000-3,000 meters, but in deep oil wells such as recent offshore oil fields, it may reach 8,000-15,000 meters. In most offshore oil fields, excavation of oil wells are carried out on a floating facility, and due to rocking of the entire facility the overall excavation operation is performed in unstable conditions.

In their environment of use, threaded joint for pipes for oil country tubular goods are subjected to loads such as axial tensile forces caused by the weight of the oil country tubular goods and the threaded joint for pipes themselves (up to 500 tons in total in the case of 7 inch steel pipes), bending forces, the combination of internal and external pressures (up to 1000 atm), and geothermal heat (200° C. or above, and up to 300° C. in some locations). Accordingly, they need to be able to maintain airtightness without undergoing damage even in such a severe environment.

A typical threaded joint for pipes used for connecting oil country tubular goods is constituted by a pin, which is a joint element having a male thread formed on the end portion of a first tubular member (which is typically an oil country tubular good), and a box, which is a joint element having a female thread formed on the end portions of a second tubular member (which is typically a threaded connecting member referred to as a coupling).

As shown in FIG. 1, with a special type of threaded joint for pipes referred to as a premium joint which was developed in order to exhibit a high degree of gas-tightness even in severe environments, there is a sealing surface on the outer peripheral portion in the vicinity of the end surface closer to the end than the male threads of the pin and on the inner peripheral surface of the base portion of the female threads of the box, and the end surface of the end of the pin and the corresponding rearmost surface of the box become torque shoulders. The portions of the pin and the box including the sealing surface and the torque shoulder are referred to as unthreaded metal contact portion. This portion of the pin is also referred to as the torque shoulder or the lip portion.

The premium threaded joint is designed so that when one end (a pin) of an oil country tubular good is inserted into a coupling (a box) and after the torque shoulders of the pin and the box contact each other the male threads and the female threads are tightened until they interfere, and the sealing surfaces of the pin and the box contact with suitable interference and form a seal by metal-to-metal contact. The gas-tightness of a threaded joint is guaranteed by such a metal seal at the sealing surface.

During the process of lowering tubing or casing into an oil well, due to various problems, it is sometimes necessary to break out a joint which has been once made up, to lift the pipes out of the oil well, to remake up them, and then relower them. API (American Petroleum Institute) requires galling resistance such that galling does not occur and airtightness is maintained even if make-up (tightening) and breakout (loosening) are repeated ten times for a joint for tubing or three times for a joint for casing.

At the time of make-up, in order to increase galling resistance and airtightness, a viscous liquid lubricant (greasy lubricant) which contains heavy metal powders and which is referred to as "compound grease" is applied to the contact surfaces (namely, the threaded portions and the unthreaded metal contact portions) of a threaded joint for pipes. Such a compound grease is specified by API Bulletin 5A2. A compound grease is required to be able to impart rust prevention to the contact surface to which the compound grease was applied.

In the past, it has been proposed to carry out various types of surface treatment such as nitriding, various types of plating including zinc plating and composite plating, and phosphate chemical conversion treatment on the contact surface of a threaded joint for pipes to form one or more layers in order to increase the retention of compound grease and improve sliding properties. However, as described below, the use of compound grease poses the threat of harmful effects on the environment and humans.

Compound grease contains large amounts of powders of heavy metals such as zinc, lead, and copper. When make-up of a threaded joint for pipes is carried out, grease which has been applied is washed off or overflows to the exterior surface, and there is the possibility of its producing harmful effects on the environment and especially on sea life, particularly due to harmful heavy metals such as lead. In addition, the process of applying compound grease worsens the working environment, and there is also a concern of its having harmful effects on humans.

In recent years, as a result of the enactment in 1998 of the OSPAR Convention (Oslo-Paris Convention) for preventing ocean pollution in the Northeast Atlantic, strict restrictions concerning the global environment are becoming more numerous, and in some regions, the use of compound grease is already in the process of restriction. Accordingly, in order to avoid harmful effects on the environment and humans in the excavation of gas wells and oil wells, a demand has developed for threaded joint for pipes which can exhibit excellent galling resistance without using compound grease. In addition, the OSPAR Convention not only regulates the use of heavy metals but also requires the use of organic substances having no or little toxicity and good biodgradability.

As a threaded joint for pipes which can be used for connecting oil country tubular goods without application of compound grease, the present inventors proposed in JP 2002-173692A (Patent Document 1) a threaded joint for pipes having a viscous liquid or semisolid lubricating coating formed thereon, and in JP 2004-53013A (Patent Document 2) a threaded joint for pipes in which tackiness of the surface of the threaded joint for pipes, which is a drawback of a viscous liquid or semisolid lubricating coating, is suppressed to minimize the adhesion of foreign matter such as dust, sand, and debris.

As stated above, in a premium threaded joint having unthreaded metal contact portions in which the pin and the box respectively have a sealing surface and a torque shoulder, gas-tightness is guaranteed by forming a metal-to-metal seal between the sealing surfaces of the pin and the box at the time of make-up.

FIG. 2 shows a torque chart (vertical axis: torque, horizontal axis: turns) at the time of make-up of this type of threaded joint. As shown in this Figure, if the pin is inserted into a box and the pin (or the box) is rotated, as rotation takes place, initially primarily the threaded portions of the pin and the box contact and torque gradually increases. As rotation advances, and the sealing surfaces of the pin and the box contact each other, the rate of increase of torque increases due to frictional resistance. If rotation further progresses and the shoulder surface at the end of the pin and the shoulder surface of the box contact each other and begin to interfere (the torque at the start of this interference is called a shouldering torque Ts), interference between the sealing surfaces takes place and the torque abruptly increases. If rotation further advances from this state and the prescribed make-up torque is reached, make-up is completed. The optimal torque in FIG. 2 means the optimal torque for achieving the necessary interference for guaranteeing gas-tightness and completing make-up, and a suitable value is previously determined based on the inner diameter of the joint and the type of joint.

However, premium threaded joints used in ultra deep wells such as those exceeding 10,000 meters have an extremely high compressive stress and bending stress applied to the threaded joint, and make-up must take place with a higher than usual make-up torque (such as 120-130% of the optimal make-up torque) so that loosening does not take place. In this case, with a threaded joint for pipes having a conventional lubricating coating, the make-up torque sometimes exceeds the torque at which the unthreaded metal contact portions of the pin and the box yield and begin to undergo plastic deformation (the torque at this time being called a yielding torque Ty). As a result, both the pin and the box undergo unrecoverable damage due to the plastic deformation due to yielding of the unthreaded metal contact portion. Even if they are not damaged, the gas tightness of the threaded joint is markedly decreased. Such a phenomenon was hardly seen when a compound grease was applied.

DISCLOSURE OF INVENTION

With a threaded joint which is made up with a high torque, it is advantageous for Ty−Ts (=ΔT which is the torque on shoulder resistance) to be as large as possible. However, it was found that a threaded joint for pipes having a conventional viscous liquid or semisolid lubricating coating as described in patent documents 1 or 2 has a lower Ty and hence a lower ΔT compared to when compound grease is applied. As a result, there is the problem that the unthreaded metal contact portions yield at a low make-up torque so that make-up can not take place with a high make-up torque.

Even if the composition of a lubricating coating is simply changed so as to vary the coefficient of friction, it was found that Ts and Ty generally vary in the same manner. For example, if the coefficient of friction of a lubricating coating increases, Ty increases but Ts also increases (referred to as high shouldering). As a result, in the worst case, even if a prescribed make-up torque is reached, the shoulder surfaces do not contact, and it is possible that make-up cannot be completed (referred to as no shouldering).

The object of the present invention is to provide a threaded joint for pipes having a lubricating coating which does not contain harmful heavy metals such as lead which impose a burden on the global environment, which imparts galling resistance, gas-tightness, and rust preventing properties, and which can guarantee a high ΔT, whereby the threaded joint does not readily undergo yielding of unthreaded metal contact portions even at the time of make-up with a high make-up torque, and a lubricating coating-forming composition for use by the threaded joint.

A lubricating coating-forming composition according to the present invention is constituted only by substances which are considered to pose little or no risk to the global environment, and compared to a conventional lubricating coating, Ts is the same or lower, while Ty is markedly higher so lubricating coating having a large ΔT can be formed on the contact surface of a threaded joint. This lubricating coating has good rust preventing properties.

The present invention is based on the following findings.

1) The reasons why yielding of unthreaded metal contact portions does not take place even with a high make-up torque when using a compound grease are thought to be as follows. Soft heavy metal powders such as lead or copper contained in compound grease generate a high frictional resistance by being crushed by the frictional surfaces and partially adhering to each other when the contact surface pressure becomes high. Namely, when the torque is low, heavy metal powders do not contribute so much to frictional resistance, but when make-up advances and the torque increases, they greatly contribute to frictional resistance and can markedly increase make-up torque. Therefore, Ty preferentially increases compared to Ts and ΔT becomes large.

2) The present inventors found that rosin and calcium fluoride are effective as materials which impart a surface pressure dependency of frictional resistance to a lubricating coating and which is good with respect to biodegradability, bioaccumulation, and non-toxicity, and which pose little or no risk to the environment. In the same manner as a compound grease, a lubricating coating containing a rosin or calcium fluoride can impart lubricating properties to a threaded joint for pipes such that yielding of the unthreaded metal contact portions does not readily take place even at a high make-up torque.

3) A threaded joint having a lubricating coating in which is blended a specific lubrication imparting component in addition to a rosin and/or calcium fluoride does not readily undergo galling even if frictional resistance is high.

From one aspect, the present invention is a composition for forming a lubricating coating on a threaded joint for pipes, which comprises one or both of a rosin and calcium fluoride; metal soap; wax; and a basic metal salt of an aromatic organic acid.

Preferably, the amount of each component in the composition in mass percent based on the total amount of non-volatile components in the composition is a total of 0.5-30% of one or both of a rosin and calcium fluoride, 2-30% of metal soap, 2-30% of wax, and 10-70% of a basic metal salt of an aromatic organic acid.

This lubricating coating-forming composition preferably further contains at least one component selected from the following:

(1) a lubricating powder and preferably graphite and more preferably an amorphous graphite having an ash content of 0.2-5.5 mass % and a crystallinity of at most 98%.

(2) magnesium carbonate (3) a carbohydrate and preferably a dextrin and more preferably a cyclodextrin, and (4) a volatile organic solvent.

A volatile organic solvent means a component which vaporizes by drying and does not substantially remain in a lubricating coating when forming a lubricating coating from this composition.

When this composition contains these components, the content of each in mass percent based on the total of non-volatile components of the composition is preferably 0.5-20% of a lubricating powder, 0.5-30% of magnesium carbonate, and 0.5-20% of a carbohydrate.

A lubricating coating-forming composition according to the present invention preferably contains substantially no harmful heavy metals. Harmful heavy metals mean heavy metals which are harmful to living organisms including humans, and in the present invention, these include Pb, Cr, Cd, and the like.

In the present invention, substantially means that an error of less than 5% is permissible. Accordingly, "containing substantially no harmful heavy metals" means that the content of heavy metals is less than 5 mass %. In addition, "substantially no volatile organic solvent remains in the lubricating coating" means that even if it remains, the amount in the coating is less than 5 mass %.

From another aspect, the present invention is a threaded joint for pipes constituted by a pin and a box each having a contact surface comprising a threaded portion and an unthreaded metal contact portion, characterized in that the contact surface of at least one of the pin and the box has a lubricating coating formed using the above described composition.

The coating thickness of the lubricating coating is preferably 10-500 μm.

A contact surface having a solid lubricating coating preferably undergoes surface treatment by a method selected from one or more of blasting treatment, pickling, phosphate chemical conversion treatment, oxalate chemical conversion treatment, borate chemical conversion treatment, electroplating, and impact plating.

When only one of the pin and the box has the lubricating coating on its contact surface, the contact surface of the other member may undergo surface treatment by a method selected from one or more of blasting, pickling, phosphate chemical conversion treatment, oxalate chemical conversion treatment, borate chemical conversion treatment, electroplating, and impact plating.

A threaded joint for pipes according to the present invention is preferably used for connecting oil country tubular goods. The present invention also provides a method of connecting a plurality of oil country tubular goods using this threaded joint for pipes without application of a grease type lubricant.

Lubricating coating formed on the contact surface of the pin and/or the box exhibits a high ΔT like a compound grease, so this threaded joint for pipes can undergo make-up operation without yielding or galling of the unthreaded metal contact portions even when make-up is carried out with a high torque. In addition, even under severe conditions such as during unstable excavation operations in the sea, this threaded joint for pipes can suppress galling.

A lubricating coating-forming composition according to the present invention contains substantially no harmful heavy metals such as lead so its poses little or no risk to the global environment. In addition, the lubricating coating which is formed has excellent rust-preventing properties and the formation of rust during storage of the threaded joint for pipes is suppressed. Accordingly, a threaded joint for pipes according to the present invention exhibits continued lubricating performance under repeated make-up and break-out, and gas-tightness after make-up can be guaranteed.

BRIEF DESCRIPTION OF THE DRAWINGS

FIG. 5 is an explanatory view showing the contact surface of a threaded joint for pipes according to the present invention in which FIG. 3(a) shows an example of surface roughening of a contact surface itself and FIG. 3(b) shows an example of forming a coating by preparatory surface treatment for surface roughening on a contact surface.

BEST MODE FOR CARRYING OUT THE INVENTION

Below, embodiments of a threaded joint for steel pipes and a lubricating coating-forming composition according to the present invention will be explained for the purpose of illustration taking a premium threaded joint for oil country tubular goods as an example.

1. Structure of a Threaded Joint for Pipes

Figure 3:
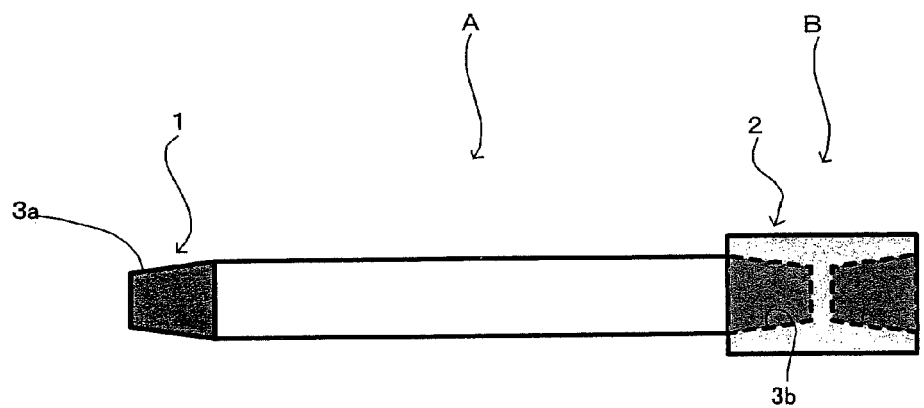
FIG. 3 schematically shows the assembled state of a steel pipe and a coupling at the time of shipment of a steel pipe.

FIG. 3 schematically shows the assembled state of a steel pipe A for an oil country tubular good and a coupling B which is a threaded joint component at the time of shipment. A pin 1 having a male threaded portion 3a on its outer surface is formed on both ends of the steel pipe A, and the coupling B has a box 2 having a female threaded portion 3b on its inner surface on both sides thereof One end of the steel pipe A is previously connected to the coupling B.

Although not shown in a drawing, a protector for protecting the threaded portions is mounted on the pin of the steel pipe A and the box of the coupling B which are not connected prior to shipment, and these protectors are removed before using the threaded joint.

In general, a threaded joint for pipes comprises a pin having male threads formed on the end portion of a first tubular member (a steel pipe A in the illustrated example) and a box having female threads formed on both ends of a second tubular member (the coupling in the illustrated example).

In a typical threaded joint for pipes, as shown in the drawing, a pin is formed on the outer surface at both ends of the steel pipe and a box is formed on the inner surface of a coupling which is a separate member. However, conversely, a threaded joint for pipes in which a box is formed on the inner surface of both ends of the steel pipe and a pin is formed on the outer surface of a coupling is theoretically possible. In addition, there are also integral threaded joints for pipes which do not use a coupling and in which a pin is formed on one end and a box is formed on the other end of a steel pipe. In this case, the first tubular member is a first steel pipe and the second tubular member is a second steel pipe. A threaded joint for pipes according to the present invention can be applied to any of these types.

Figure 4:
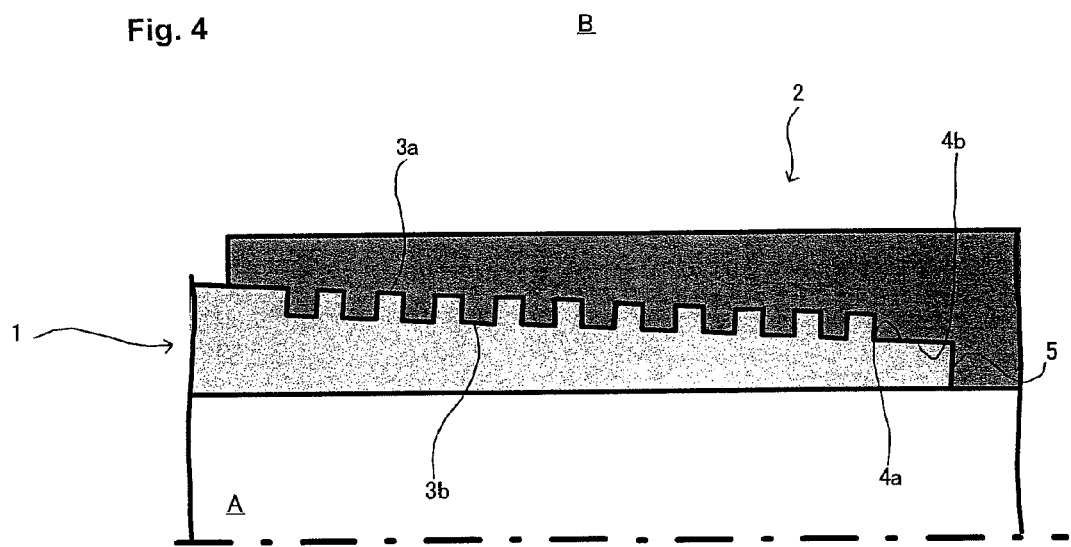
FIG. 4 schematically shows the connecting portion of a threaded joint for pipes of the premium threaded joint type.

FIG. 4 schematically shows the structure of a threaded joint for pipes of the typical premium threaded joint type. A threaded joint for pipes comprises a pin 1 formed on the outer surface of both ends of a steel pipe, for example, and a box 2 formed on the inner surface of a coupling, for example. The pin 1 has a male threaded portion 3a, a sealing surface 4a positioned closer to the end of the steel pipe, and a torque shoulder 5a at the end of the pin 1 which primarily receives a compressive force applied in the axial direction of the steel pipe at the completion of make-up. The portion of the pin closer to the tip than the threaded portion, namely, the portion including the sealing surface 4a and the shoulder surface 5a is the unthreaded metal contact portion of the pin (referred to as the torque shoulder portion or the lip portion). Correspondingly, the box 2 has a female threaded portion 3b, a sealing surface 4b on the inner side thereof, and a torque shoulder surface 5b which opposes the torque shoulder surface 5a of the pin 1 and which primarily receives compressive force applied in the axial direction of the coupling at the completion of make-up. A portion including the sealing surface 4b and the torque shoulder 5b is the unthreaded metal contact portion of the box.

The threaded portions 3a and 3b, the sealing surfaces 4a and 4b, and the shoulder portions 5a and 5b of the pin 1 and the box 2 are the contact surfaces of the threaded joint for pipes. These contact surfaces need to have galling resistance, gas-tightness, and rust preventing properties. In the past, for this purpose, a lubricating grease such as compound grease containing heavy metal particles was applied, or a viscous liquid or semisolid lubricating coating was formed on the contact surfaces. However, as stated above, compound grease has an adverse effect on humans and the environment, and a lubricating coating has a low value of $\Delta T$, so when make-up takes place with a high torque, the unthreaded metal contact portions of the pin and/or the box (the shoulder surfaces and/or the sealing surfaces) yield before the completion of make-up, and there is the possibility of the sealing ability decreasing.

Figure 5:
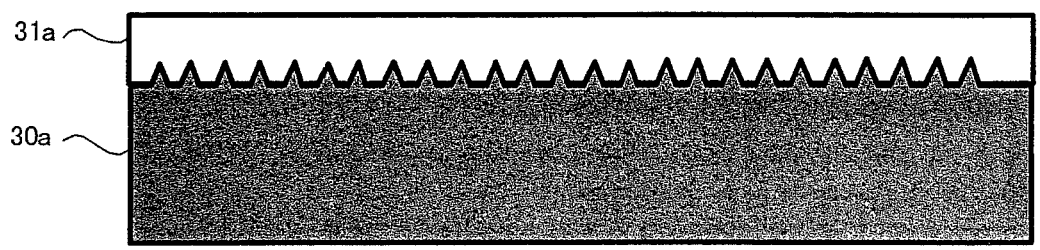
Figure 5:
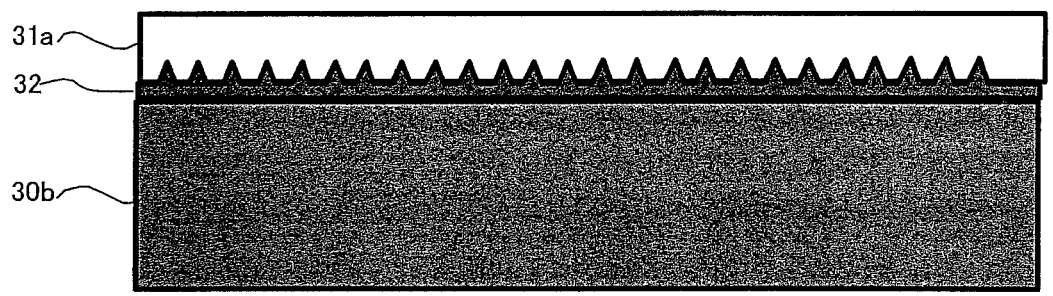

According to the present invention, as shown with respect to an unthreaded metal contact portion in FIGS. 5a and 5b, the contact surface of at least one of the pin and the box is covered by a lubricating coating 31 formed atop the surface of a steel 30a and 30b. At the time of make-up of a threaded joint for pipes, this lubricating coating exhibits the same excellent lubricating properties and gas-tightness maintaining effect as compound grease. Therefore, even if a threaded joint for pipes according to the present invention repeatedly undergoes make-up with a high torque and breakout without using a lubricating grease, galling of the threaded joint for pipes can be prevented without yielding of the unthreaded metal contact portion of the pin and the box and gas-tightness can also be guaranteed after make-up.

The substrate for the lubricating coating 31a (namely, the contact surface of the threaded joint for pipes) is preferably made a rough surface. This surface roughening is achieved by direct surface roughening by means of blasting or pickling of the surface of steel 30a as shown in FIG. 5(A) or by forming a preparatory surface treatment layer 32 which has a rough surface on the surface of steel 30b prior to forming the lubricating coating 31 as shown in FIG. 5(B).

The lubricating coating 31a can be formed by applying the below described lubricating coating-forming composition by a suitable method such as brush application, spraying, immersion, or hot melt spraying and then if necessary, vaporizing a solvent and drying.

The lubricating coating may be formed on the contact surfaces of both the pin and the box, but as shown in FIG. 3, in the side of the pipe in which a pin and a box are connected at the time of shipment, it is sufficient to form a lubricating coating on the contact surface of only one of the pin and the box. In this case, it is easier to perform application for preparatory surface treatment and lubricating coating formation on a short coupling than on a long steel pipe, so it is preferable to form a lubricating coating on the contact surface of the coupling (normally the contact surface of the box). In the other side of the pipe in which a pin and a box are not connected, it is preferable to form a lubricating coating on the contact surfaces of both the pin and the box and to impart both lubricating properties and rust preventing properties. As a result, a decrease in lubricating properties and gas-tightness due to rust formation can be prevented.

A lubricating coating should cover the entire contact surface of the pin and/or the box, but the present invention includes the situation in which only a portion of the contact surface (such as only the sealing surface) is covered.

2. Lubricating Coating (1) General Explanation

A threaded joint for pipes according to the present invention has a lubricating coating on the contact surface of at least one of the pin and box thereof in order to prevent galling at the time of tightening (make-up) and provide the joint with anticorrosive properties. The lubricating coating comprises at least the following components: one or both of a rosin and calcium fluoride, wax, a basic metal salt of an aromatic organic acid, and a metal soap. Each of these components is a substance which is less harmful to the environment (a substance with a low environmental impact). The lubricating coating may optionally contain the below-described additional components.

Preferably the lubricating coating doe not contain any heavy metals in a substantial amount (specifically, in an amount of 5 mass % or more of the lubricating coating) and more preferably it does not contain any heavy metals at all. Compound grease which has conventionally been used contains a large amount of soft heavy metals such as lead and zinc in powder form in order to prevent galling which takes place by metal-to-metal contact in the contact surfaces between the pin and the box and prevent the unthreaded metal contact portions (a seal and a shoulder) of the joint from yielding. However, according to the present invention, the above-described components make it possible to form a lubricating coating which can exhibit sufficient lubricating properties to prevent the occurrence of galling and yielding of the unthreaded metal contact portions when a high torque is applied, even if the coating does not contain heavy metals.

The content of each component which is described below is the content in a lubricating coating, which is substantially the same as the content based on the total nonvolatile matters of a lubricating coating composition for forming a lubricating coating. For each component, two or more materials can be used, in which case, the content of the component is calculated from the total amount of the materials.

In the following description, all the contents in percent are in percent by mass (mass %).

(2) Ty-Enhancing Component (Component for Enhancing Ty)

The lubricating coating contains one or both of a rosin and calcium fluoride as a main Ty-enhancing component.

(2-1) Rosin

A rosin is a natural resin secreted from trees of the pine family. The presence of a rosin in a lubricating coating makes it possible to provide the lubricating coating with the property that it has a low frictional resistance while the torque applied is low, with the frictional resistance increasing as the torque increases. Thus, a lubricating coating having an increased $\Delta T$ in which Ty is increased while Ts remains low can be realized by the presence of a rosin in the lubricating coating in a suitable amount. A rosin is a naturally occurring substance, so it is highly biodegradable and therefore meets the recent environmental criteria which demand high biodegradability.

A rosin is a nonvolatile matter of pine oleoresin, which is contained in the plants of the pine family. It is a resin constituted by the three elements carbon, hydrogen, and oxygen, and it contains resin acids having the formula: $C_{20}H_{30}O_2$ as the main ingredient. Typical resin acids are abietic acid and d- and l-pimaric acid, but at least 10 isomers are known.

Rosins are classified as liquid rosins produced by fractionating a crude toll oil which is a by-product in the production of kraft pulp, gum rosins produced by collecting a raw rosin (pine oleoresin) excreted from an incision of the trunk of a pine tree followed by purification, and wood rosins produced by subjecting chipped stumps of felled pine trees to solvent extraction. Any of these rosins can be used. In addition, various commercially available rosin derivative such as rosin esters, hydrogenated rosins, polymerized rosins, and disproportionated rosins can also be used. Thus, the term "rosin" used herein is intended to include both rosin and rosin derivatives as described above.

The content of a rosin in a lubricating coating is preferably in the range of from 0.5% to 30%. At a rosin content of less than 0.5%, the above-described effect of a rosin is insufficient. When the rosin content is more than 30%, a lubricant may generate an extremely high level of friction and tend to allow the ready occurrence of galling, depending on the other components which are present in the coating. In addition, the formation of a lubricating coating may become difficult due to an increased viscosity of a lubricating coating composition. The rosin content is more preferably in the range of 5-25% and even more preferably in the range of 10-20%.

(2-2) Calcium Fluoride

Calcium fluoride ($CaF_2$) is an environmentally harmless and stable substance. When present in a lubricating coating, it can effectively increase Ty without an increase in Ts and thus increase $\Delta T$ on a torque chart obtained when a threaded joint for pipes is tightened. In other words, it can function in the same manner as a rosin as described above. As a result, it becomes possible to complete make-up of a threaded joint for pipes with a high torque without causing the unthreaded metal contact portions to yield. With this objective, calcium fluoride can be included in a lubricating coating in place of or in addition to a rosin.

Although the mechanism by which calcium fluoride can increase $\Delta T$ has not been clarified adequately, it is thought to be as follows. Calcium fluoride is relatively soft and has cleaving properties, namely, it cleaves by the action of a rapid temperature change. Therefore, calcium fluoride in a lubricating coating does not have an effect on friction when the torque with which a threaded joint for pipes is tightened is low, but when the torque becomes high, calcium fluoride can be discharged into the frictional interface by abrasion of the coating and forced onto the metal surfaces as if it adheres to the surfaces in the same manner as lead, thereby increasing the friction immediately before completion of make-up and preventing the occurrence of galling.

Both naturally occurring and synthetic calcium fluoride can be used. Naturally occurring calcium fluoride is produced as fluorite. Chemical synthesis of calcium fluoride is possible by the Stockbarger method although it is time- and energy-consuming. It is preferred to use calcium fluoride having an average particle diameter of not greater than 50 μm and more preferably 1-30 μm.

The content of calcium fluoride in a lubricating coating is preferably from 0.5% to 30%. If it is less than 0.5%, its effect on increasing $\Delta T$ is not appreciable, while if it is greater than 30%, the strength of the lubricating coating may be decreased to such an extent that lubricity is insufficient. The content of calcium fluoride is more preferably 1-20% and even more preferably 1-10%.

When a lubricating coating contains both a rosin and calcium fluoride, the total content of these substances is preferably 0.5-30% and more preferably 5-25% and even more preferably 10-20%.

(3) Basic Metal Salt of an Aromatic Organic Acid

A basic metal salt of an aromatic organic acid is highly effective in order to provide a lubricating coating with antigalling and anticorrosive properties.

Typical examples of a basic metal salt of an aromatic organic acid are basic sulfonates, basic salicylates, basic phenates, basic carboxylates, and the like. These salts are in the form of a basic salt formed from an aromatic organic acid with excess alkali (an alkali metal or an alkaline earth metal), and they are grease-like or semisolid substances in which excess alkali is dispersed as minute colloidal particles in an oil. These substances have significant heavy duty anticorrosive properties, and the excess metal salt in the form of colloidal minute particles exhibits lubricity. The basic metal salt of an aromatic organic acid may be in the form of its compound with an oxide wax.

The alkali which constitutes the cation part of this basic metal salt of an aromatic organic acid may be an alkali metal, but preferably it is an alkaline earth metal and particularly calcium, barium, or magnesium.

The higher the basicity of the basic metal salt of an aromatic organic acid, the greater the amount of the metal salt which works as a lubricant, and the better is the galling resistance. In addition, when the basicity exceeds a certain level, it has the effect of neutralizing acid components, so the anticorrosive properties of the lubricating coating increase. For these reasons, the basic metal salt of an aromatic organic acid used in the present invention preferably has a basicity (JIS K 2501) (when using two or more, the weighted average of the basicity taking weight into consideration) of at least 50 mg KOH/g. However, if the metal salt has a basicity exceeding 500 mg KOH/g, its hydrophilicity increases to an extent that it begins to adversely affect the anticorrosive properties and it becomes easy for rusting to occur. A preferred basicity is in the range of 100-500 mg KOH/g, and more preferably it is in the range of 250-450 mg KOH/g.

The content of the basic metal salt of an aromatic organic acid in a lubricating coating is preferably in the range of 10-70%. If it is too low, the coating has insufficient antigalling and anticorrosive properties, while if it is too high, the strength of the coating may become insufficient to maintain the coating. The content of the basic metal salt of an aromatic organic acid is more preferably in the range of 20-60% and still more preferably in the range of 40-50%.

(4) Metal Soap

A metal soap is a salt of a fatty acid with a metal other than an alkali metal. Like a basic metal salt of an aromatic organic acid, metal soap can provide a lubricating coating with both galling resistance and anticorrosive properties. However, due to different mechanisms between these two components, both components are used in combination, thereby making it possible to obtain a lubricating coating having high levels of antigalling and anticorrosive properties.

From the standpoint of lubricating properties and anticorrosive properties, the fatty acid which constitutes the metal soap is preferably one having 12-30 carbon atoms. The fatty acid can be either saturated or unsaturated. Mixed fatty acids derived from natural oils and fats such as beef tallow, lard, wool fat, palm oil, rapeseed oil, and coconut oil, as well as single compounds such as lauric acid, tridecylic acid, myristic acid, palmitic acid, lanopalmitic acid, stearic acid, isostearic acid, oleic acid, elaidic acid, arachic acid, behenic acid, erucic acid, lignoceric acid, lanoceric acid, a sulfonic acid, salicylic acid, and a carboxylic acid can be used. A mixture of these may also be used. The salt is preferably in the form of a calcium or zinc salt, but other alkaline metal salts (such as a magnesium salt or a barium salt) or other metal salts may be used. The salts may be either a neutral salt or a basic salt.

The content of metal soap in a lubricating coating is preferably in the range of 2-30%. If it is too low, the intended effect of metal soap is insufficient, and if it is too high, the lubricating coating may have a decreased adhesion or strength. More preferably, the content is in the range of 5-25% and even more preferably 10-20%.

As described above, a basic metal salt of an aromatic organic acid and metal soap both are effective for improving antigalling properties and anticorrosive properties. In order to achieve this effect satisfactorily, the total content of these two components is preferably at least 30%, more preferably at least 40%, and still more preferably at least 50%. The upper limit of this total content is preferably 90% and more preferably 80%.

(5) Wax

Wax not only has the effect of preventing galling but it also decreases the fluidity of a lubricating coating composition and improves the strength of the resulting coating. Any of animal, vegetable, mineral, and synthetic waxes may be used. Examples of waxes which can be used are animal waxes such as beeswax and whale tallow; vegetable waxes such as Japan wax, carnauba wax, candelilla wax, and rice wax; mineral waxes suc as paraffin wax, microcrystalline wax, petrolatum, montan wax, ozokerite, and ceresine; and synthetic waxes such as oxide wax, polyethylene wax, Fischer-Tropsch wax, amide wax, hardened castor oil (castor wax). Of these, paraffin wax with a molecular weight of 150-500 is particularly preferred.

The content of wax in a lubricating coating is preferably in the range of 2-30%. If the content is too high, the adhesion of the lubricating coating decreases. The content of wax is more preferably in the range of 2-20% and still more preferably in the range of 5-15%.

In addition to the above-described components, a lubricating coating formed on a threaded joint for pipes according to the present invention may contain one or more optional components as required.

(6) Lubricating Powder

Lubricating powder is a component which is preferably contained in a lubricating coating since it can further improves the antigalling properties of the lubricating coating while maintaining Ts at a low value by increasing the strength of the coating and suppressing its fluidity at high temperatures.

As lubricating powder, a nontoxic and harmless powder selected from those which are used as a so-called solid lubricant is used. Preferably, one or more lubricating powders selected from graphite, tungsten disulfide ($WS_2$), molybdenum disulfide ($MoS_2$), tin disulfide, graphite fluoride, boron nitride (BN), cryolite, and PTFE (polytetrafluoroethylene) are used. Of these, graphite is preferred in view of its stability in a corrosive environment and from the standpoint of the environment.

Graphite is classified as natural graphite and artificial graphite. Of these, natural graphite is less expensive. Natural graphite is classified into flake graphite, vein graphite, and amorphous graphite according to its appearance. Among these, amorphous graphite, that is the least crystalline graphite, is preferred in order to simultaneously achieve an increase in $\Delta T$ and improvement in resistance to galling. Further taking electrical and thermal properties into account, amorphous graphite having an ash content of 0.2-5.5 mass % and a crystallinity of at most 98% is more preferable. Particularly, amorphous graphite having a crystallinity of 90-98% is preferred. The average particle diameter of graphite is preferably 1-20 μm and more preferably 1-15 μm.

When a lubricating coating contains a lubricating powder, its content is preferably in the range of 0.5-20%. A content of less than 0.5% is not sufficient to exhibit the desired effect, while a content in excess of 20% may interfere with the effects of other components and adversely affects the dispersibility of the lubricating powder to form a uniform dispersion and the fluidity of the lubricating coating at the time of friction. The content of the lubricating powder is more preferably in the range of 0.5-10% and even more preferably in the range of 1-5%.

(7) Magnesium Carbonate

When a lubricating coating contains magnesium carbonate ($MgCO_3$) along with a rosin and/or calcium fluoride, the effect of the rosin and/or calcium fluoride on increasing $\Delta T$ is further enhanced. As a result, even if a threaded joint for pipes is tightened with a very high torque, it becomes possible to complete make-up without causing the unthreaded metal contact portions to yield. With this objective, magnesium carbonate can be included in a lubricating coating.

Either naturally occurring or synthetic magnesium carbonate can be used. Magnesium carbonate naturally occurs as magnesite. Dolomite [$CaMg(CO_3)_2$], which is a natural double salt mineral of magnesium carbonate with calcium carbonate, may be used in a lubricating coating as a source of magnesium carbonate. Basic magnesium carbonate [$mMgCO_3 \cdot Mg(OH)_2 \cdot nH_2O$], which is obtained by adding sodium carbonate or potassium carbonate to an aqueous solution of a magnesium salt to cause precipitation, may also be used. Basic magnesium carbonate has different compositions (the values for m and n in the above formula) depending on the method for its production. Usually, m is between 3 and 5 and n is between 3 and 7. Of course, magnesium carbonate produced by chemical synthesis may be used. Magnesium carbonate having an average particle diameter of 0.1-10 μm is preferred.

When a lubricating coating contains magnesium carbonate, its content is preferably in the range of 0.5-30%. A content of less than 0.5% is not sufficient to exhibit the desired effect, while a content in excess of 30% may cause the strength of the lubricating coating to decrease. The content is more preferably in the range of 1-20% and even more preferably in the range of 1-10%. It is also preferable that the total content of magnesium carbonate and a rosin and/or calcium fluoride not exceed 30%.

(8) Carbohydrate

A carbohydrate, when present in a lubricating coating, has the effect of increasing $\Delta T$ on making up of a threaded joint. The mechanism of this effect is not clarified yet, but is presumed to relate to a high viscosity which a carbohydrate exhibits at a high pressure.

Examples of a carbohydrate which can be used in the present invention include monosaccharides such as glucose; disaccharides such as sucrose; oligosaccharides including dextrins such as dextrin and cyclodextrins; polysaccharides including starches (e.g., wheat starch, corn starch, tapioca starch, and potato starch), phosphate ester salts of these starches (e.g., alkali metal salts), celluloses (e.g., reed, straw, sawdust and wood fiber celluloses), phosphate ester salts of these celluloses (e.g., alkali metal salts), glucomannan (such as konjak powder), galacturonan, xylan, fructan, and the like; and alginate salts (e.g., alkali metal salts).

Particularly preferable carbohydrates are dextrins including cyclodextrins, and even more preferred are cyclodextrins (also referred to as Schardinger dextrins, cycloamyloses, cyclomaltoses or cycloglucans). Cyclodextrins are cyclic oligosaccharides composed of 6-8 glucopyranose units which are cyclized through $\alpha$1-4 linkage. A cyclodextrin having 6, 7, or 8 glucopyranose units are referred to as $\alpha$-cyclodextrin, $\beta$-cyclodextrin, or $\gamma$-cyclodextrin, respectively. Any of $\alpha$-, $\beta$-, and $\gamma$-cyclodextrin exhibits a satisfacgtory effect in a lubricating coating, but particularly $\beta$-cyclodextrin is suitable because it has the highest effect.

When a lubricating coating contains a carbohydrate, its content is preferably in the range of 0.1-20%. A content of less than 0.1% has little effect, while a content in excess of 20% may cause the strength of the lubricating coating and hence the lubricity thereof to decrease. The content is more preferably in the range of 0.5-15% and even more preferably in the range of 1-10%.

(9) Other Optional Additives

A lubricating coating formed on a threaded joint for pipes according to the present invention may contain one or more components other than those described above, such as components selected from organic resins, and various oils and additives (such as extreme pressure agents) which are conventionally used in a lubricating oil.

(9-1) Organic Resin

An organic resin and particularly a thermoplastic resin acts to suppress tackiness of a lubricating coating and increases the thickness of the coating. Moreover, when it is introduced into a frictional interface, it increases galling resistance and decrease friction between the contact surfaces of a threaded joint for pipes even when a high make-up torque (a high pressure) is applied.

Examples of thermoplastic resins which can be used are polyethylene resins, polypropylene resins, polystyrene resins, poly(methyl acrylate) resins, styrene/acrylic acid ester copolymer resins, and polyamide resins. Copolymers or blends of these or of these with other thermoplastic resins can also be used. The thermoplastic resin preferably has a density (JIS K 7112) in the range of 0.9-1.2, and its thermal deformation temperature (JIS K 7206) is preferably in the range of 50-150° C. to get the higher lubricity by deforming easily between the frictional surfaces of a threaded joint for pipes.

If the thermoplastic resin is present in a lubricating coating in the form of particles, it works for lubrication in the same way as a solid lubricant when it is introduced into a frictional interface, and it is particularly effective at increasing galling resistance. Therefore, a thermoplastic resin is preferably present in the lubricating coating in the form of a powder and particularly a spherical powder. In this case, if the composition used for forming the lubricating coating (referred to below as the "lubricating coating composition") contains a solvent, a thermoplastic resin which does not dissolve in the solvent is selected. The powder of the thermoplastic resin can be dispersed or suspended in the solvent, and it does not matter if it swells in the solvent.

The powder of the thermoplastic resin preferably has a fine particle diameter from the standpoints of increasing the coating thickness and increasing galling resistance. However, if the particle diameter is smaller than 0.05 μm, gelling of the lubricating coating composition becomes marked, and it becomes difficult to form a coating having a uniform thickness. On the other hand, if the particle diameter exceeds 30 μm, it becomes difficult to introduce the powder into the frictional interface, and it tends to form a sediment or float in the lubricating coating thereby making it difficult to form a uniform coating. Accordingly, the particle diameter of the thermoplastic resin powder is preferably in the range of 0.05-30 μm and more preferably in the range of 0.07-20 μm.

When a lubricating coating contains an organic resin, its content in the coating is preferably at most 10% and more preferably in the range of 0.1-5%.

(9-2) Oil Components

An oil component means a lubricating component which is used in a lubricating oil and which is liquid (which may be viscous or greasy) at room temperature, and which itself has lubricity. Examples of useful oil components are natural fatty oils, synthetic esters, and mineral oils. Incidentally, the above-described basic metal salt of an aromatic organic acid is a kind of oil components.

A natural fatty oil which can be used as an oil component includes beef tallow, lard, wool fat, palm oil, rapeseed oil, and coconut oil. A mineral oil (including a synthetic mineral oil) which has a viscosity of 10-300 cSt at 40° C. can also be used as an oil component. A natural fatty oil is used mainly for the purpose of adjusting the viscosity of the lubricating coating.

A synthetic ester can increase the plasticity of the thermoplastic resin and at the same time can increase the fluidity of the lubricating coating when the coating is subjected to hydrostatic pressure. A synthetic ester with a high melting point can also serve to adjust the melting point and the hardness (or softness) of a lubricating coating according to the present invention. Examples of synthetic esters are fatty acid monoesters, dibasic acid diesters, and fatty acid esters of trimethylolpropane and pentaerythritol.

Examples of fatty acid monoesters are monoesters of carboxylic acids having 12-24 carbon atoms such as myristic acid, palmitic acid, stearic acid, oleic acid, isostearic acid, linolic acid, linolenic acid, elaidic acid, arachic acid, behenic acid, erucic acid, and lignoceric acid with higher alcohols having 8-20 carbon atoms such as octyl alcohol, capryl alcohol, nonyl alcohol, decyl alcohol, lauryl alcohol, tridecyl alcohol, myristyl alcohol, cetyl alcohol, stearyl alcohol, isostearyl alcohol, oleyl alcohol, and decyl alcohol.

Examples of dibasic acid diesters are diesters of dibasic acids having 6-10 carbon atoms such as adipic acid, pimelic acid, suberic acid, azelaic acid, and sebacic acid with higher alcohols having 8-20 carbon atoms such as those listed with respect to monoesters.

Examples of fatty acids which form a fatty acid ester of trimethylolpropane or pentaerythritol are those having 8-18 carbon atoms such as caprylic acid, decylic acid, lauric acid, myristic acid, palmitic acid, stearic acid, oleic acid, and isostearic acid.

When a lubricating coating contains an oil component, the content of the oil component is preferably at least 0.1% in order to achieve an improvement in galling resistance. In order to prevent a decrease in coating strength, its content is preferably at most 5%.

(9-3) Extreme Pressure Agent

An extreme pressure agent has the effect of increasing the galling resistance of a lubricating coating when added in a small amount. Nonlimiting examples of an extreme pressure agent are vulcanized oils, polysulfides, phosphates, phosphites, thiophosphates, and dithiophosphoric acid metal salts. When present in a lubricating coating, an extreme pressure agent preferably has a content in the range of 0.05-5% and more preferably 0.05-3%.

Examples of preferred vulcanized oils are compounds which are obtained by adding sulfur to unsaturated animal or vegetable oils such as olive oil, castor oil, rice bran oil, cottonseed oil, rapeseed oil, soy bean oil, corn oil, beef tallow, and lard and heating the mixture, with the resulting oil containing 5-30 mass % of sulfur.

Examples of preferred polysulfides are polysulfide compounds of the formula $R_1$—$(S)_c$—$R_2$ (wherein $R_1$ and $R_2$ may be the same or different and indicate an alkyl group having 4-22 carbon atoms, an aryl group, an alkylaryl group, or an arylalkyl group each with up to 22 carbon atoms, and c is an integer from 2 to 5) and olefin sulfides containing 2-5 sulfur bonds in one molecule. Dibenzyl disulfide, di-tert-dodecyl polysulfide, and di-tert-nonyl polysulfide are particularly preferred.

Phosphates, phosphites, thiophosphates, and dithiophosphoric acid metal salts may be of the following general formulas:

phosphates: $(R_3O)(R_4O)P(=O)(OR_5)$ phosphites: $(R_3O)(R_4O)P(OR_5)$ thiophosphates: $(R_3O)(R_4O)P(=S)(OR_5)$ dithiophosphoric acid metal salts:$[(R_3O)(R_6O)P(=S)$'$S]_2$-M In the above formulas, $R_3$ and $R_6$ indicate an alkyl group, a cycloalkyl group, an alkylcycloalkyl group, or an aryl group, an alkylaryl group, or an arylalkyl group (each of these groups having up to 24 carbon atoms), $R_4$ and $R_5$ indicate a hydrogen atom or an alkyl group, a cycloalkyl group, an alkylcycloalkyl group, an aryl group, an alkylaryl group, or an arylalkyl group (each of these having up to 24 carbon atoms), and M indicates molybdenum (Mo), zinc (Zn), or barium (Ba).

Particularly preferred examples of these compounds include tricresyl phosphate and dioctyl phosphate for phosphates; tristearyl phosphite, tridecyl phosphite, and dilaurlyl hydrogen phosphite for phosphites; trialkyl thiophosphate in which each of $R_3$, $R_4$, and $R_5$ is an alkyl group having 12 or 13 carbon atoms and alkyltriphenyl thiophosphate for thiophosphates; and zinc dialkyl dithiophosphate in which each of $R_3$ and $R_6$ is a primary or secondary alkyl group having 3-20 carbon atoms for dithiophosphoric acid metal salts.

3. Lubricating Coating Composition

A lubricating coating is formed by preparing a lubricating coating composition comprising the above-described components and applying the composition to the contact surface of a threaded joint for pipes followed by drying the resulting coating, if necessary.

In addition to the above-described components, a lubricating coating composition which is used may contain a volatile organic solvent depending on the method of and conditions for application. Application of a composition which contains a solvent efficiently facilitates the formation of a lubricating coating having uniform thickness and structure. In this case, the content of each of the above-described components in a lubricating coating composition is based on the total content of nonvolatile components (namely, components other than the solvent).

A volatile organic solvent is used as a solvent in the coating composition. In contrast to a base oil in a lubricating oil, the solvent evaporates during the process of forming the coating, and substantially no solvent remains in the resulting lubricating coating. "Volatile" means that it has a tendency to vaporize when in the form of a coating at a temperature from room temperature to 150° C. However, since a lubricating coating according to the present invention is in the form of a viscous liquid or a semisolid, it is possible for a slight amount of solvent to remain in the coating.

Preferably the solvent can dissolve a rosin. It is also preferable that the solvent not dissolve wax.

Examples of volatile solvents which are suitable for use in the present invention are petroleum solvents such as cleaning solvents and mineral spirits, both specified as industrial gasoline by JIS K 2201, aromatic petroleum naphtha, xylene, and Cellosolves. A mixture of two or more of these may be used. A solvent having a flash point of at least 30° C., an initial boiling point of at least 150° C., and a final boiling point of at most 210° C. is preferred from the standpoints that it is relatively easy to handle and evaporates rapidly so that the drying time can be short.

The lubricating coating composition may further contain one or more additional components such as an antioxidant, a preservative, and a colorant, in addition to the above-described components.

A lubricating coating composition can be prepared in a conventional manner.

For example, in the case of a lubricating coating composition which does not contain a solvent, wax is initially heated to melt at a temperature higher than its melting temperature, and the other components are mixed with the melt to prepare a lubricating coating composition. If the resulting composition remains in liquid state, it can be applied to a threaded joint for pipes as it is or after being diluted with a solvent. Alternatively, the liquid composition can be applied after heating in a state in which it has an increased fluidity. If the resulting coating composition is in the form of a solid or semisolid, it can be applied using a spray gun after it is made fluid by heating, as in hot-melt coating. A solid composition can be applied in the same manner as the powder coating technique by depositing the composition in powder form on a heated threaded joint for pipes and allowing the composition to melt, if necessary with heating. Upon cooling, a lubricating coating is formed.

A lubricating coating composition can also be prepared using a volatile organic solvent without melting wax by dissolving or dispersing all the components of the coating in the solvent. In this case, the viscosity (kinematic viscosity in $cSt<10^{-6}$ $m^2/s>$ as measured by a Brookfield viscometer) of the lubricating coating composition may be appropriately selected depending on the coating method and can be adjusted by the amount of the solvent. A preferable viscosity is at most 4000 $cSt<10^{-6}$ $m^2/s>$ at 40° C. in the case of spray coating or immersion and at most 1000 $cSt<10^{-6}$ $m^2/s>$ at 60° C. in the case of brush coating.

4. Thickness of Lubricating Coating

The thickness of a lubricating coating is preferably in the range of 10-500 μm and more preferably in the range of 20-200 μm.

A lubricating coating preferably has a sufficient thickness to fill minute gaps in the contact surfaces such as gaps between thread crests. If the coating thickness is less than 10 μm, the characteristic effects of a viscous liquid or semisolid lubricating coating that oil seeps from the frictional surface due to hydrostatic pressure generated at the time of make-up and that oily lubricating components flow into a gap from other gaps can no longer be obtained easily. In addition, anticorrosive properties are also insufficient. On the other hand, if the lubricating coating is too thick, not only is lubricant wasted, but the prevention of environmental pollution, which is one of the objects of the present invention, is impeded. From this standpoint, the upper limit on the thickness of the lubricating coating is preferably around 500 μm.

However, as explained below, when the contact surface on which the lubricating coating is formed is roughened, the thickness of the lubricating coating is preferably made larger than the value of Rz (10 point mean surface roughness) of the roughened contact surface. When the contact surface is roughened, the thickness of the lubricating coating is the mean value of the coating thickness throughout the coating, which can be calculated by the area, weight, and density of the coating.

As a general tendency regarding the appearance of the lubricating coating, when the coating contains a considerable amount of an oil component (other than a basic metal salt of an aromatic organic acid), it becomes a viscous liquid coating, and when the amount of the oil component is small or when the coating contains no oil component, it becomes a semisolid coating.

5. Preparatory Surface Treatment

In order to improve galling resistance, it is desirable that the contact surface or surfaces of a threaded joint for pipes on which a lubricating coating is formed according to the present invention be subjected to preparatory surface treatment for roughening prior to the formation of the lubricating coating. Roughening or surface roughening means any process which can form a surface having a roughness which is greater than the surface roughness formed by machining, which is 3-5 μm.

Examples of such preparatory surface treatment are blasting by shooting a blasting material such as spherical shot or angular grit; and pickling by immersion in a strongly acidic solution such as sulfuric acid, hydrochloric acid, nitric acid, or hydrofluoric acid for roughening the surface. These methods roughen the contact surface itself as shown in FIG. 5(A).

Another type of preparatory surface treatment for roughening is a method capable of forming a preparatory (underlying) coating having an increased surface roughness on the contact surface, as shown in FIG. 5(B). Such preparatory surface treatment includes chemical conversion treatment such as phosphate treatment, oxalate treatment, or borate treatment, in which a porous coating made of acicular crystals or the like having a large surface roughness is formed; and metal plating. Metal plating which can be employed includes electroplating with copper, iron, tin, zinc, or their alloys (projections are preferentially plated, so the surface becomes slightly rougher); impact plating capable of forming a porous plated coating; and composite metal electroplating to form a coating having minute solid particles dispersed in metal (the surface is roughened by the solid particles which project from the plated coating).

Two or more of the above-described methods may be applied to the contact surface for the purpose of roughening. Whichever surface treatment method is used for the contact surface, it is preferably carried out such that the surface has a surface roughness Rz in the range of 5-40 μm. If Rz is less than 5 μm, adhesion and retention of the lubricating coating are not be sufficiently improved. On the other hand, if Rz exceeds 40 μm, the friction of the surface significantly increases, and there are cases in which the coating cannot withstand shearing forces and compressive forces when undergoing a high pressure so that it is easily destroyed or peels off.

From the standpoint of the adhesion of the lubricating coating, surface treatment methods which can form a porous coating, i.e., chemical conversion treatment and impact plating are preferred. In this case, in order to allow the porous coating to have a surface roughness of at least 5 μm, the coating preferably has a thickness of at least 5 μm. There is no upper limit on the coating thickness, but usually it is at most 50 μm and preferably at most 40 μm. By forming a lubricating coating atop a porous coating formed by preparatory surface treatment, the adhesion of the lubricating coating is increased by the so-called "anchor effect". As a result, it becomes difficult for peeling of the lubricating coating to take place even if make-up and break-out are repeated, direct contact between metals in the contact surface is effectively prevented, and galling resistance, gas-tightness, and corrosion resistance are further increased.

Particularly preferred methods for preparatory surface treatment to form a porous coating are phosphate treatment (phosphating) using manganese phosphate, zinc phosphate, iron manganese phosphate, or zinc calcium phosphate, and impact plating to form a zinc or zinc-iron alloy coating. From the standpoint of adhesion of a lubricating coating formed thereon, a manganese phosphate coating is preferred, and from the standpoint of corrosion prevention, a zinc or zinc-iron alloy coating which can be expected to provide a sacrificial corrosion effect due to zinc is preferred.

Phosphating can be carried out by immersion or spraying in a conventional manner. A common phosphating solution for use in treatment of zinc-plated steels which is an acidic solution of a phosphate can be used. For example, a typical zinc phosphating solution comprises 1-150 g/L of phosphate ions, 3-70 g/L of zinc ions, 1-100 g/L of nitrate ions, and 0-30 g/L of nickel ions. A manganese phosphating solution which is often used for surface treatment of a threaded joint for pipes can also be used. The temperature of a phosphating solution which is used may be from room temperature to 100° C. and the duration of treatment may be up to 15 minutes depending on the desired coating thickness. In order to accelerate the formation of a phosphate coating, prior to phosphating, the surface to be treated can be supplied with an aqueous surface conditioning solution containing colloidal titanium. After treatment with a phosphating solution, the treated surface is preferably washed with cold or warm water prior to drying.

Impact plating can be carried out by mechanical plating in which particles are impacted with a material to be plated inside a rotating barrel, or by blast plating in which particles are impacted against a material to be plated using a blasting apparatus. In the present invention, it is sufficient to plate just the contact surface, so it is preferable to employ blast plating which can perform localized plating.

Blast plating can be performed using particles having an iron-based core coated with zinc or a zinc alloy, which are allowed to impinge against a contact surface to be coated. The particles preferably have a content of zinc or zinc alloy in the range of 20-60% and a particle diameter in the range of 0.2-1.5 mm. When the particles impinge against the contact surface, only the zinc or zinc alloy covering layer of the particles adheres to the contact surface, so a porous coating of zinc or a zinc alloy is formed atop the contact surface. Blast plating can form a plated coating having good adhesion to a steel surface regardless of the composition of the steel.

Another type of surface treatment may be employed. For example, one or more plating layers with a metal or metal alloy are effective at improving the adhesion of a lubricating coating to its substrate surface and hence at improving the galling resistance of a threaded joint for pipes, although they do not have much effect on surface roughening.

Examples of such plating methods include electroplating with a metal such as Cu, Sn, or Ni or its alloy. Either single-layer or multiple-layer plating is possible. Specific examples of such electroplating include Cu plating, Sn plating, and Ni plating, as well as single-layer plating with a Cu—Sn alloy or a Cu—Sn—Zn alloy, two-layer plating with a Cu layer and an Sn layer, and three-layer plating with a Ni layer, a Cu layer, and a Sn layer. For a threaded joint for pipes made of a steel having a Cr content greater than 5% which can easily experience galling, it is preferred to perform preparatory surface treatment by single layer Cu—Sn or Cu—Sn—Zn alloy plating or multiple-layer plating in which such alloy plating, Cu plating, Sn plating, and Ni plating are combined so as to form two or more plated layers, such as two-layer plating of Cu plating-Sn plating, Ni plating-Sn plating, or Ni plating-Cu/Sn/Zn alloy plating, and three-layer plating of Ni plating-Cu plating-Sn plating.

In the case of multiple-layer plating, the lowest plated layer (usually Ni or Cu) is an extremely thin plated layer with a thickness on the order of 1 µm or less formed by the technique called strike plating. The thickness of this type of electroplating (the total thickness in the case of multiple-layer plating) is preferably in the range of 5-15 µm.

6. Upper Dry Coating

The above-described lubricating coating formed on a contact surface of a threaded joint for pipes according to the present invention is a viscous liquid or semisolid coating which has a more or less tacky surface. Particularly, a lubricating coating in the form of a viscous liquid has a greater tackiness. As a result, particularly when OCTG which are connected by the threaded joint for pipes are stood vertically, rust remaining on the inner surface of the OCTG and abrasive particles for blasting which are introduced into the OCTG for rust removal fall off, and they adhere to the lubricating coating and end up being embedded therein. This causes a decrease in the lubricating properties of the coating since the embedded foreign matter can not be completely removed by air blowing or similar means.

In order to eliminate this problem, a thin dry solid coating may be formed atop the lubricating coating. The dry solid coating may be an ordinary resin coating (e.g., a coating of an epoxy resin, a polyamide resin, a polyamideimide resin, or a vinyl resin), and it can be formed from either a water-based or organic solvent-based coating composition. A small amount of wax may be included in the coating. It is sufficient for the thickness of the upper dry coating to be roughly in the range of 5-40 µm.

7. Surface Treatment of the Other Member

When a lubricating coating according to the present invention is formed on the contact surface of just one of the pin and the box (e.g., the box) of a threaded joint for pipes, the contact surface of the other member (e.g., the pin) which is not coated with this coating may be left in an untreated state, but preferably, it is subjected to the above-described preparatory surface treatment to roughen the contact surface. Thus, surface roughening can be carried out by a method selected from blasting, pickling, chemical conversion treatment with a phosphate, oxalate, or borate, electroplating, impact plating, and composite electroplating which forms a plated coating containing minute solid particles, and a combination of two or more of these methods. As a result, when the other member is connected to the first member which has a lubricating coating according to the present invention on its contact surface, the contact surface of the other member not having a lubricating coating exhibits good holding ability of the lubricating coating from the first member due to the anchor effect produced by surface roughening, thereby increasing the galling resistance of the threaded joint for pipes.

In order to impart anticorrosive properties, a known rust-preventing coating such as a coating of a UV-curable resin or thermosetting resin may be formed, as required, atop the contact surface of the other member which may be either untreated or roughened as described above. By preventing the contact surface from being exposed to air by means of this rust-preventing coating, even when the contact surface is brought into contact with condensed water during storage, the occurrence of rust on the contact surface is prevented.

Since there is no restriction on the type of surface treatment of the contact surface of the other member, other surface treatment methods which are not described above can be employed. For example, a lubricating coating which is not according to the present invention may be formed on that contact surface.

EXAMPLES

The effects of the present invention will be illustrated by the following examples, which are not intended to restrict the present invention in any manner. In the following description, the contact surface including the threaded portion and the unthreaded metal contact portion of a pin will be referred to as the "pin surface", and the contact surface including the threaded portion and the unthreaded metal contact portion of a box will be referred to as the "box surface".

In the examples, a threaded joint for pipes (outer diameter=17.78 cm (7 inches), wall thickness=1.036 cm (0.408 inches), a premium threaded joint having a threaded portion, an unthreaded metal contact portion and a shoulder) made from the carbon steel A, the Cr—Mo steel B, the 13% Cr steel C, or the high alloy steel D shown in Table 1 (galling occurs increasingly easily from composition A to composition D) was used. These threaded joints for pipes were made up (tightened) with a make-up torque which was optimal for the thread shape (interference). The optimum make-up torque used was 14 kN-m for Example 1 or 20 kN-m for Examples 2-4.

TABLE 1

| Chemical composition of threaded joint for pipes (mass %, remainder: Fe and impurities) | | | | | | | | |
|---|---|---|---|---|---|---|---|---|
| | C | Si | Mn | P | S | Cu | Ni | Cr | Mo |
| A | 0.24 | 0.3 | 1.3 | 0.02 | 0.01 | 0.04 | 0.07 | 0.17 | 0.04 |
| B | 0.25 | 0.25 | 0.8 | 0.02 | 0.01 | 0.04 | 0.05 | 0.95 | 0.18 |
| C | 0.19 | 0.25 | 0.8 | 0.02 | 0.01 | 0.04 | 0.1 | 13 | 0.04 |
| D | 0.02 | 0.3 | 0.5 | 0.02 | 0.01 | 0.5 | 7 | 25 | 3.2 |

In the examples, a lubricating coating was formed by either the following method (1) or (2):

(1) Solvent method: A lubricating coating composition prepared by adding a volatile organic solvent (mineral spirits) in an amount of 20 parts by mass (in Examples 1-3) or 30 parts by mass (in Example 4) to 100 parts by mass of the total of the components constituting a lubricating coating having a predetermined composition so as to lower the viscosity was applied by spray coating at ambient temperature, and the organic solvent was allowed to volatilize by air drying to form a lubricating coating.

(2) Heating method: A lubricating coating composition having a predetermined composition (containing no solvent) was heated to form a liquid having a low viscosity, and the liquid was applied by spraying, thereby forming a lubricating coating upon cooling.

The rosin used in the examples was a rosin ester manufactured by Arakawa Chemical Industries under the tradename Ester Gum H.

The following salts were used as basic metal salts of an aromatic organic acid:

Basic Ca sulfonate: BRYTON C-500 manufactured by Witco (a calcium sulfonate having a basicity of 400 mgKOH/g);

Basic Ca phenate: AD-410J manufactured by Adibis (a calcium phenate having a basicity of 400 mgKOH/g);

Basic Ca salicylate: OSCA 438 manufactured by Osca (a calcium salicylate having a basicity of 320 mgKOH/g);

Basic Ca carboxylate: LUBRIZOL L5341 manufactured by Lubrizol (a calcium carboxylate having a basicity of 400 mgKOH/g); and Oxide wax Ca soap: NA-SUL CA/W1935 manufactured by King Industries (a compound of a Ca sulfonate with a basicity of 400 mgKOH/g and an oxide wax).

Ca stearate and Zn stearate used as metal soap were those manufactured by DIC Corporation.

In the lubricating powders used in the examples, the mere expression "graphite" indicates "amorphous graphite". The amorphous graphite used in the examples was graphite powder manufactured by Nippon Graphite Industries under the tradename "Blue P" (ash content: 3.79 mass %, crystallinity: 96.9%, average particle diameter: 7 μm).

β-CD (β-cyclodextrin) and CD (a mixture of α-, β-, and γ-cyclodextrins) used as a carbohydrate were those of the CAVAMAX SERIES manufactured by Wacker Fine Chemicals.

As the preparatory surface treatment employed in the examples, manganese phosphating (Mn phosphating) was carried out by immersion for 10 minutes in a manganese phosphating solution (Parphos M1A manufactured by Nihon Parkerizing) at a temperature of 80-95° C. and zinc phosphating (Zn phosphating) was carried out by immersion for 10 minutes in a zinc phosphating solution (Parbond 181X manufactured by Nihon Parkerizing) at a temperature of 75-85° C. The alloy plating which was also employed for preparatory surface treatment was Cu—Sn—Zn alloy plating in which the Cu:Sn:Zn mass ratio was 60:35:5 or Cu—Sn alloy plating in which the Cu:Sn mass ratio was 60:40.

In the examples, the surface roughness was expressed in Rz and was measured using Surtronic 10 manufactured by Rank-Taylor-Hobson). The surface roughness as finished by machine grinding was always 3 μm. Sand blasting was carried out using #80 sand.

Example 1

This example illustrates lubricating coatings which contain a rosin.

The pin surface and the box surface of a threaded joint for pipes made from the carbon steel A, the Cr—Mo steel B, the 13% Cr steel C, or the high alloy steel D were separately subjected to the preparatory surface treatment shown in Table 2.

Atop the pin surface and the box surface which had been surface treated, a lubricating coating having the composition shown in Table 3 was formed by the solvent method (with a solvent in an amount of 20 parts by mass) or the heating method. The lubricant coatings formed on the pin surface and the box surface had the same composition. In Table 3, the content of each component in the lubricating coating compositions is expressed in % based on the total content of non-volatile components (exclusive of the solvent, if used) in the compositions. Among the components shown in Table 3, wax was paraffin wax in all the test runs.

The threaded joint for pipes having a lubricating coating on the pin surface and the box surface was subjected to a repeated make-up and break-out (tightening and loosening) test to evaluate the galling resistance of the joint.

In the repeated make-up and break-out test, a threaded joint for pipes was made up at a make-up speed of 10 rpm with a make-up torque of 14 kN-m, and after break-out, the contact surfaces of the pin and the box were investigated for galling. When scratches due to galling which developed during make-up were slight and it was possible to again perform make-up after repair, repair was performed and make-up and break-out were repeated ten times. The results of the make-up and break-out test are shown in Table 4.

Figure 1:
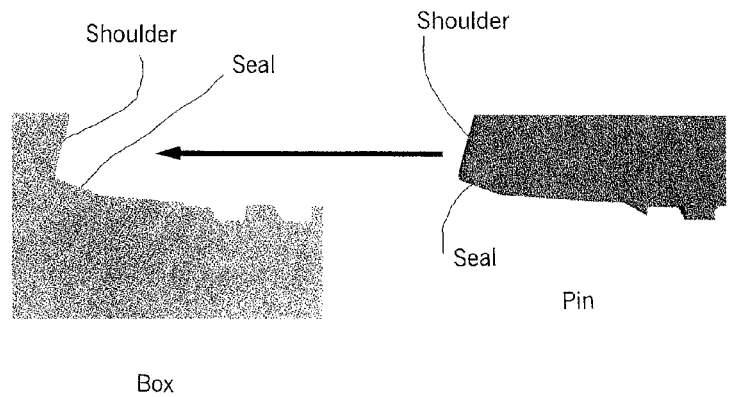
FIG. 1 schematically shows the shoulder portion and the sealing surface (the unthreaded metal contact portion) of a premium threaded joint.
Figure 2:
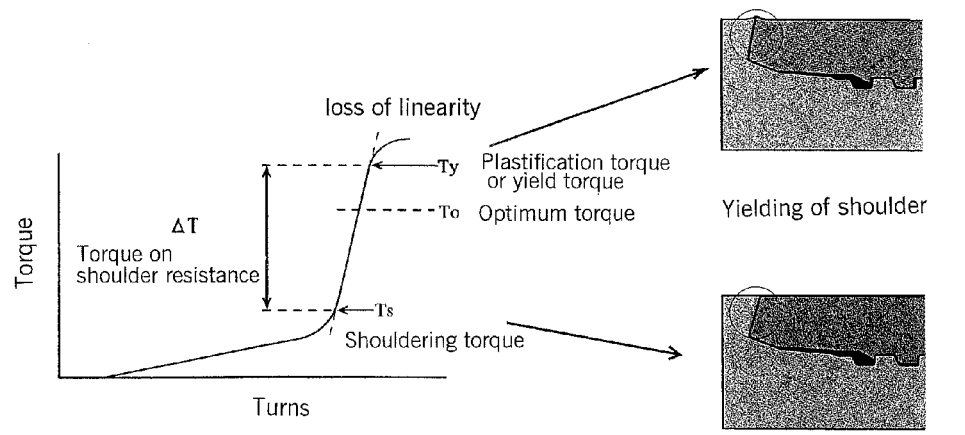
FIG. 2 is a typical torque chart during make-up of a premium threaded joint.

Apart from the above-described test, another threaded joint for pipes which was the same as above with respect to the steel material, preparatory surface treatment, and lubricating coating was prepared, and a torque chart as shown in FIG. 2 was recorded by carrying out make-up of the joint with a high torque. On the resulting torque chart, the values of Ts (shouldering torque), Ty (torque at yield), and ΔT (=Ty−Ts) were determined. Ts is the torque when the shoulder portions (unthreaded metal contact portions) of the pin and box begin to interfere with each other. Specifically, Ts is the torque when the change of torque on the torque chart which appears after the shoulder portions interfere with each other begins to separate from the linear region (elastic deformation range). Ty is the torque when plastic deformation of the shoulder portions begins. Specifically, Ty is the torque when the change of torque by relative rotation of the pin and the box begins to lose its linearity after the torque has reached Ts. The value of ΔT (=Ty−Ts) is shown in Table 4 by the relative value when ΔT obtained with the compound grease used in the Control which is shown in Tables 3 and 4 is 100.

TABLE 2

Preparatory sruface treatment and lubricating coating

| Run No. | Steel | Preparatory surface treatment Box | Preparatory surface treatment Pin | Lubricating coating Method | Lubricating coating Thickness (μm) Box | Lubricating coating Thickness (μm) Pin |
|---|---|---|---|---|---|---|
| 1 | A | 1. Grinding (R = 3) <br> 2. Mn phosphating (R = 12) (t = 15) | 1. Grinding (R = 3) <br> 2. Zn phosphating (R = 8) (t = 10) | Solvent | 20 | 20 |
| 2 | B | 1. Grinding (R = 3) <br> 2. Mn phosphating (R = 10) (t = 12) | 1. Grinding (R = 3) <br> 2. Zn phosphating (R = 8) (t = 12) | Solvent | 40 | 40 |
| 3 | B | 1. Grinding (R = 3) <br> 2. Mn phosphating (R = 10) (t = 12) | 1. Grinding (R = 3) <br> 2. Zn phosphating (R = 8) (t = 10) | Solvent | 40 | 40 |
| 4 | B | 1. Grinding (R = 3) <br> 2. Mn phosphating (R = 10) (t = 12) | 1. Grinding (R = 3) <br> 2. Zn phosphating (R = 8) (t = 10) | Solvent | 50 | 50 |
| 5 | D | 1. Grinding (R = 3) <br> 2. Zinc impact plating (R = 5) (t = 7) | Sand blasting (R = 10) | Heating | 25 | 20 |

TABLE 2-continued

Preparatory surface treatment and lubricating coating

| Run No. | Steel | Preparatory surface treatment Box | Pin | Lubricating coating Method | Thickness (μm) Box | Pin |
|---|---|---|---|---|---|---|
| 6 | C | 1. Grinding (R = 3) 2. Ni strike plating + Cu plating (t = 7) (R = 2) | Sand blasting (R = 10) | Heating | 50 | 50 |
| 7 | C | 1. Grinding (R = 3) 2. Ni strike plating + Cu—Sn plating (t = 12) (R = 3) | Sand blasting (R = 10) | Solvent | 40 | 40 |
| 8 | C | 1. Grinding (R = 3) 2. Ni strike plating + Cu—Sn—Zn plating (t = 7) (R = 2) | Sand blasting (R = 10) | Solvent | 40 | 40 |
| Control | A | 1. Grinding (R = 3) 2. Mn phosphating (R = 10) (t = 15) | Grinding (R = 3) | Compound grease | | |
| 9 | B | 1. Grinding (R = 3) 2. Mn phosphating (R = 10) (t = 15) | Grinding (R = 3) | Solvent | 40 | 40 |

R: Surface roughness Rz (μm),
t: Thickness (μm)

TABLE 3

Lubricating coating composition on solids basis (mass %)

| Run No. | Rosin | Metal soap (Ca stearate) | Wax | Lubricating powder | Basic Ca sulfonate |
|---|---|---|---|---|---|
| 1 | 0.5 | 20 | 10 | Graphite* (0.5) | Remainder |
| 2 | 1 | 15 | 10 | Graphite* (2) | Remainder |
| 3 | 10 | 10 | 10 | Graphite* (5) Mg carbonate (2) | Remainder |
| 4 | 20 | 10 | 10 | Graphite* (10) | Remainder |
| 5 | 10 | 15 | 10 | Graphite* (5) | Remainder |
| 6 | 10 | 15 | 10 | Graphite* (5) | Remainder |
| 7 | 10 | 15 | 10 | Graphite** (5) | Remainder |
| 8 | 10 | 18 | 10 | Tungsten disulfide (3) | Remainder |
| Control | Compound grease specified in API BUL 5A2 | | | | |
| 9 | 0 | 20 | 10 | 0 | Remainder |

*Amorphous graphite;
**Flake graphite

TABLE 4

| Run No. | Occurrence of galling[1] (Number: make-up cycle) | | | | | | | | | | ΔT[2] |
|---|---|---|---|---|---|---|---|---|---|---|---|
| | 1 | 2 | 3 | 4 | 5 | 6 | 7 | 8 | 9 | 10 | |
| 1 | ○ | ○ | ○ | ○ | ○ | ○ | ○ | ○ | ○ | ○ | 80 |
| 2 | ○ | ○ | ○ | ○ | ○ | ○ | ○ | ○ | ○ | ○ | 95 |
| 3 | ○ | ○ | ○ | ○ | ○ | ○ | ○ | ○ | ○ | Δ | 100 |
| 4 | ○ | ○ | ○ | ○ | ○ | ○ | ○ | ○ | Δ | Δ | 110 |
| 5 | ○ | ○ | ○ | ○ | ○ | Δ | Δ | Δ | Δ | Δ | 98 |
| 6 | ○ | ○ | ○ | ○ | ○ | ○ | ○ | Δ | Δ | Δ | 95 |
| 7 | ○ | ○ | ○ | ○ | ○ | ○ | ○ | Δ | Δ | Δ | 92 |
| 8 | ○ | ○ | ○ | ○ | ○ | ○ | ○ | Δ | Δ | Δ | 90 |
| Control | ○ | ○ | ○ | ○ | ○ | ○ | ○ | ○ | ○ | ○ | 100 |
| 9 | ○ | ○ | ○ | ○ | ○ | ○ | ○ | ○ | Δ | Δ | 40 |

(Note)
[1] ○: No occurrence of galling
Δ: Occurrence of slight galling (capable of continuing make-up after repair)
x: Occurrence of severe galling (unrepairable)
—: Test terminated
[2] ΔT(=Ty − Ts) (Relative value when ΔT in Control is 100)

(Run No. 1)

The following surface treatment was performed on a threaded joint for pipes made of the carbon steel having composition A shown in Table 1.

On the box surface, which had been finished by machine grinding, a manganese phosphate coating with a thickness of 15 μm (Rz: 12 μm) was formed, and then a lubricating coating having the composition of Run No. 1 shown in Table 3 and a thickness of 20 μm was formed by the solvent method. On the pin surface, which had been finished by machine grinding, a zinc phosphate coating with a thickness of 15 μm (Rz: 10 μm) was formed, and then the same lubricating coating as was formed on the box surface was formed.

(Run No. 2)

The following surface treatment was performed on a threaded joint for pipes made of the Cr—Mo steel having composition B shown in Table 1.

On the box surface, which had been finished by machine grinding, a manganese phosphate coating with a thickness of 12 μm (Rz: 10 μm) was formed, and then a lubricating coating having the composition of Run No. 2 shown in Table 3 and a thickness of 40 μm was formed by the solvent method. On the pin surface, which had been finished by machine grinding, a zinc phosphate coating with a thickness of 12 μm (Rz: 8 μm) was formed, and then the same lubricating coating as was formed on the box surface was formed.

(Run No. 3)

The following surface treatment was performed on a threaded joint for pipes made of the Cr—Mo steel having composition B shown in Table 1.

On the box surface, which had been finished by machine grinding, a manganese phosphate coating with a thickness of 12 μm (Rz: 10 μm) was formed, and then a lubricating coating having the composition of Run No. 3 shown in Table 3 and a thickness of 40 μm was formed by the solvent method. On the pin surface, which had been finished by machine grinding, a zinc phosphate coating with a thickness of 10 μm (Rz: 8 μm) was formed, and then the same lubricating coating as was formed on the box surface was formed.

(Run No. 4)

The following surface treatment was performed on a threaded joint for pipes made of the Cr—Mo steel having composition B shown in Table 1.

On the box surface, which had been finished finished by machine grinding, a manganese phosphate coating with a thickness of 12 μm (Rz: 10 μm) was formed, and then a lubricating coating having the composition of Run No. 4 shown in Table 3 and a thickness of 50 μm was formed by the solvent method. On the pin surface, which had been finished by machine grinding, a zinc phosphate coating with a thickness of 10 µm (Rz: 8 µm) was formed, and then the same lubricating coating as was formed on the box surface was formed.

(Run No. 5)

The following surface treatment was performed on a threaded joint for pipes made of the high alloy steel having composition D shown in Table 1.

On the box surface, which had been finished by machine grinding, a porous zinc plated coating with a thickness of 7 µm (Rz: 5 µm) was formed by blast plating with particles having an iron core coated with zinc, and then a lubricating coating with a thickness of 25 µm was formed by the heating method in which the composition of Run No. 5 shown in Table 3 was heated to 60° C. so as to have a lowered viscosity and then applied by spray coating. On the pin surface, the same lubricating coating (with a thickness of 20 µm) as on the box surface was formed by the same heating method after sand blasting to roughen the surface to Rz 10 µm.

(Run No. 6)

The following surface treatment was performed on a threaded joint for pipes made of the 13% Cr steel having composition C shown in Table 1.

The box surface, which had been finished by machine grinding was subjected to Ni strike plating and then Cu plating to a thickness of 7 µm (total plating thickness: 8 µm), both by electroplating. Atop the plated surface which had an Rz of 2 µm, a lubricating coating having the composition of Run No. 6 shown in Table 3 and a thickness of 50 µm was formed by the same heating method as employed in Run No. 5. On the pin surface, the same lubricating coating with a thickness of 50 µm was formed in the same manner as for the box surface after sand blasting to roughen the surface to Rz 10 µm.

(Run No. 7)

The following surface treatment was performed on a threaded joint for pipes made of the 13% Cr steel having composition C shown in Table 1.

The box surface, which had been finished by machine grinding was subjected to Ni strike plating and then copper-tin alloy plating to a thickness of 12 µm (total plating thickness: 13 µm), both by electroplating. Atop the plated surface which had an Rz of 3 µm, a lubricating coating having the composition of Run No. 7 shown in Table 3 and a thickness of 40 µm was formed by the solvent method. On the pin surface, the same lubricating coating was formed in the same manner as for the box surface after sand blasting to roughen the surface to Rz 10 µm.

(Run No. 8)

The following surface treatment was performed on a threaded joint for pipes made of the 13% Cr steel having composition C shown in Table 1.

The box surface, which had been finished by machine grinding was subjected to Ni strike plating and then copper-tin-zinc alloy plating to a thickness of 7 µm (total plating thickness: 8 µm), both by electroplating. Atop the plated surface which had an Rz of 2 µm, a lubricating coating having the composition of Run No. 8 shown in Table 3 and a thickness of 40 µm was formed by the solvent method. On the pin surface, the same lubricating coating was formed in the same manner as for the box surface after sand blasting to roughen the surface to Rz 10 µm.

(Control Run)

The following surface treatment was performed on a threaded joint for pipes made of the carbon steel having composition A shown in Table 1.

On the box surface, which had been finished by machine grinding, a manganese phosphate coating with a thickness of 15 µm (Rz 10 µm) was formed, and atop this coating, a viscous liquid compound grease meeting API standards was applied (the combined coating weight on the pin and the box was 50 grams, the total area applied was approximately 1400 cm$^2$). The pin surface was finished by machine grinding, and the above-described compound grease was applied thereto.

In ten cycles of the make-up and break-out test, as shown in Table 4, there was no occurrence of galling up to the tenth cycle. However, in this test run, the compound grease contained harmful heavy metals such as lead, and it can be considered harmful to humans and the environment.

(Run No. 9—Comparative)

The following surface treatment was performed on a threaded joint for pipes made of the Cr—Mo steel having composition B shown in Table 1.

On the box surface, which had been finished by machine grinding, a manganese phosphate coating with a thickness of 15 µm (Rz: 10 µm) was formed, and then a lubricating coating having the composition of Run No. 9 shown in Table 3 and a thickness of 40 µm was formed by the solvent method. On the pin surface, which had been finished by machine grinding, the same lubricating coating as was formed on the box surface was formed.

As shown in Table 4, in Runs Nos. 1-8 according to the present invention, even in the case that slight galling occurred during ten cycles of the make-up and break-out test, by performing repair, make-up and break-out could be performed through the tenth cycle. This result is of a level having no problems with respect to galling resistance. Slight galling tends to occur earlier with a threaded joint for pipes made of 13Cr steel or a high alloy steel, which are more susceptible to galling.

The relative values of ΔT in the high-torque make-up test compared to that obtained in the Control where the compound grease was used were at least 90% in all of Runs Nos. 1-8 except Run No. 1 in which the rosin content was a very low value of 0.5%. Thus, it can be seen that the lubricating coatings formed in accordance with the present invention have a large ΔT which is comparable to that of compound grease, and yielding of the unthreaded metal contact portions does not readily occur even if make-up is carried out with a high torque.

In Run No. 9 which is a comparative example, the value of ΔT was insufficient. Therefore, if this threaded joint for pipes is made up with a torque which is higher than an optimal torque, yielding of the unthreaded metal contact portions may readily occur.

In order to evaluate anticorrosive properties which are demanded of a threaded joint for pipes, a coupon-shaped test piece (70 mm×150 mm×2 mm thick) of the same steel was prepared, and after it was subjected to the same preparatory surface treatment shown in Table 2 for the box surface, the same lubricating coating as shown in Table 3 (with the same thickness as for the pin surface) was formed on the treated surface. The test piece was then subjected to a humidity test (200 hours at a temperature of 50° C. and a humidity of 98%). It was confirmed by this test that there was no occurrence of rust for any of Runs Nos. 1 to 7.

Example 2

This example illustrates lubricating coatings which contain calcium fluoride. The material and size of the threaded joint for pipes used in this example for testing were the same as in Example 1. The type of preparatory surface treatment applied to and the composition of the lubricating coating formed on the pin and box surfaces in each run are shown in Tables 5 and 6, respectively.

When the solvent method was employed to form a lubricating coating, the amount of a solvent which was used was 20 parts by mass. The formation of a lubricating coating by the heating method was carried out by heating a lubricating coating composition having a predetermined composition and containing no solvent (namely, having the same composition as that desired for the lubricating coating) at 130° C. to form a low viscosity liquid before use, and applying the liquid by spray coating onto the pin surface or the box surface which had been preheated at 130° C. using a spray gun equipped with a heat retaining means.

The threaded joint for pipes were subjected to a repeated make-up and break-out test and a high torque test in the same manner as described in Example 1 except that the make-up torque in the repeated make-up and break-out test was 20 kN-m. The test results are shown in Table 7. In Table 7, the ratio in % of Ts determined in the high torque test to the optimal make-up torque (a value set according to the steel type and shape of a threaded joint for steel pipes) in each run is also shown.

TABLE 5

Preparatory sruface treatment and lubricating coating

| Run No. | Steel | Preparatory surface treatment Box | Preparatory surface treatment Pin | Lubricating coating Method | Lubricating coating Thickness (μm) Box | Lubricating coating Thickness (μm) Pin |
|---|---|---|---|---|---|---|
| 1~6 | B | 1. Grinding (R = 3)<br>2. Mn phosphating (R = 10) (t = 12) | 1. Grinding (R = 3)<br>2. Zn phosphating (R = 8) (t = 12) | Solvent | 40-50 | 40-50 |
| 7 | A | 1. Grinding (R = 3)<br>2. Mn phosphating (R = 12) (t = 15) | 1. Grinding (R = 3)<br>2. Zn phosphating (R = 10) (t = 15) | Heating | 40 | 40 |
| 8 | C | 1. Grinding (R = 3)<br>2. Ni strike plating + Cu plating (t = 12) (R = 3) | Sand blasting (R = 10) | Heating | 50 | 40 |
| 9 | D | 1. Grinding (R = 3)<br>2. Ni strike plating + Cu—Sn—Zn alloy plating (t = 7) (R = 2) | Sand blasting (R = 10) | Heating | 40 | 40 |
| Control | A | 1. Grinding (R = 3)<br>2. Mn phosphating (R = 12) (t = 15) | Grinding (R = 3) | Compound grease | | |
| 10 | B | 1. Grinding (R = 3)<br>2. Mn phosphating (R = 10) (t = 12) | Grinding (R = 3) | Solvent | 40 | 40 |
| 11 | B | 1. Grinding (R = 3)<br>2. Mn phosphating (R = 10) (t = 12) | Grinding (R = 3) | Solvent | 40 | 40 |
| 12 | A | 1. Grinding (R = 3)<br>2. Mn phosphating (R = 12) (t = 15) | Grinding (R = 3) | Heating | 40 | 40 |

R: Surface roughness Rz (μm), t: Thickness (μm)

TABLE 6

Lubricating coating composition on solids basis (mass %)

| Run No. | Calcium fluoride | Wax | Metal soap | Lubricating powder | Basis metal salt of an aromatid organic acid | Others |
|---|---|---|---|---|---|---|
| 1 | D = 10 (1.0) | Paraffin wax (10) | Ca stearate (15) | Graphite (10) | Basic Ca sulfonate (Rem) | None |
| 2 | D = 10 (5) | Paraffin wax (10) | Ca stearate (15) | Graphite (10) | Basic Ca sulfonate (Rem) | None |
| 3 | D = 10 (10) | Paraffin wax (10) | Ca stearate (15) | Graphite (10) | Basic Ca sulfonate (Rem) | None |
| 4 | D = 10 (30) | Paraffin wax (10) | Ca stearate (15) | Graphite (10) | Basic Ca sulfonate (Rem) | None |
| 5 | D = 10 (40) | Paraffin wax (10) | Ca stearate (15) | Graphite (10) | Basic Ca sulfonate (Rem) | None |
| 6 | D = 10 (10) | Paraffin wax (10) | Ca stearate (15) | Graphite (10) | Basic Ca Salicylate (Rem) | Rosin (10) |
| 7 | D = 30 (10) | Carnauba wax (15)<br>Polyethylene wax (10) | Zn stearate (15) | Graphite fluoride (4) | Oxide wax-Ca soap (Rem) | None |
| 8 | D = 30 (20) | Carnauba wax (15)<br>Polyethylene wax (10) | Zn stearate (15) | MoS$_2$ (5) | Oxide wax-Ca soap (Rem) | None |
| 9 | D = 30 (30) | Carnauba wax (15)<br>Polyethylene wax (10) | Zn stearate (15) | WS$_2$ (5) | Oxide wax-Ca soap (Rem) | None |
| Control | | Compound grease as specified in API BUL 5A2 | | | | |
| 10 | 0 | Paraffin wax (10) | Ca stearate (15) | Graphite (6) | Basic Ca sulfonate (Rem) | None |
| 11 | 0 | Paraffin wax (10) | Ca stearate (15) | Graphite (6) | Basic Ca sulfonate (Rem) | CaCO$_3$ (10) |
| 12 | 0 | Carnauba wax (15)<br>Polyethylene wax (10) | Zn stearate (15) | Graphite fluoride (4) | Oxide wax-Ca soap (Rem) | TiO$_2$, ZnO, Bi$_2$O$_3$ (total 10) |

D: Average particle diameter of calcium fluoride (μm)

TABLE 7

| Run No. | Occurrence of galling [1] (Number: make-up cycle) | | | | | | | | | | Ts [2] (%) | ΔT [3] |
|---|---|---|---|---|---|---|---|---|---|---|---|---|
| | 1 | 2 | 3 | 4 | 5 | 6 | 7 | 8 | 9 | 10 | | |
| 1 | ○ | ○ | ○ | ○ | ○ | ○ | ○ | ○ | ○ | ○ | 25 | 95 |
| 2 | ○ | ○ | ○ | ○ | ○ | ○ | ○ | ○ | ○ | ○ | 27 | 101 |
| 3 | ○ | ○ | ○ | ○ | ○ | ○ | ○ | ○ | ○ | ○ | 29 | 110 |
| 4 | ○ | ○ | ○ | ○ | ○ | ○ | ○ | ○ | ○ | ○ | 30 | 122 |
| 5 | ○ | ○ | ○ | ○ | ○ | ○ | Δ | Δ | Δ | Δ | 32 | 130 |
| 6 | ○ | ○ | ○ | ○ | ○ | ○ | ○ | ○ | ○ | ○ | 33 | 113 |
| 7 | ○ | ○ | ○ | ○ | ○ | ○ | ○ | ○ | ○ | ○ | 29 | 98 |
| 8 | ○ | ○ | ○ | ○ | ○ | ○ | ○ | Δ | Δ | Δ | 32 | 107 |
| 9 | ○ | ○ | ○ | ○ | ○ | ○ | Δ | Δ | Δ | Δ | 34 | 115 |
| Control | ○ | ○ | ○ | ○ | ○ | ○ | ○ | ○ | ○ | ○ | 30 | 100 |
| 10 | ○ | ○ | ○ | ○ | ○ | ○ | ○ | ○ | ○ | ○ | 26 | 65 |
| 11 | ○ | ○ | ○ | ○ | Δ | Δ | Δ | x | — | — | 38 | 82 |
| 12 | ○ | ○ | ○ | ○ | ○ | ○ | ○ | ○ | Δ | Δ | 32 | 71 |

(Note)
[1] ○: No occurrence of galling
Δ: Occurrence of slight galling (capable of continuing make-up after repair)
x: Occurrence of severe galling (unrepairable)
—: Test terminated
[2] Ratio (%) of Ts to the optimum make-up torque
[3] ΔT(=Ty − Ts) (Relative value when ΔT in Control is 100)

(Runs Nos. 1-6)

The following surface treatment was performed on a threaded joint for pipes made of the Cr—Mo steel having composition B shown in Table 1.

On the box surface, which had been finished by machine grinding, a manganese phosphate coating with a thickness of 12 μm (Rz: 10 μm) was formed, and then a lubricating coating having the composition shown in Table 6 was formed by the solvent method.

On the pin surface, which had been finished by machine grinding, a zinc phosphate coating with a thickness of 12 μm (Rz: 8 μm) was formed, and then the same lubricating coating as was formed on the box surface was formed.

The thickness of the lubricating coating formed was 40 μm in Runs Nos. 1 and 3, 42 μm in Run No. 2, and 50 μm in Runs Nos. 4-6. The thickness was the same on the pin surface and the box surface.

(Run No. 7)

The following surface treatment was performed on a threaded joint for pipes made of the carbon steel having composition A shown in Table 1.

On the box surface, which had been finished by machine grinding, a manganese phosphate coating with a thickness of 15 μm (Rz: 12 μm) was formed, and then a lubricating coating having the composition of Run No. 7 shown in Table 6 and a thickness of 40 μm was formed by the above-described heating method. On the pin surface, which had been finished by machine grinding, a zinc phosphate coating with a thickness of 15 μm (Rz: 12 μm) was formed, and then the same lubricating coating as was formed on the box surface was formed.

(Run No. 8)

The following surface treatment was performed on a threaded joint for pipes made of the 13% Cr steel having composition C shown in Table 1.

The box surface, which had been finished by machine grinding was subjected to Ni strike plating and then Cu plating, both by electroplating, to form a plated coating having a total thickness of 12 μm. Atop the plated surface which had an Rz of 3 μm, a lubricating coating having the composition of Run No. 8 shown in Table 6 and a thickness of 50 μm was formed by the above-described heating method. On the pin surface, the same lubricating coating with a thickness of 40 μm was formed in the same manner as for the box surface after sand blasting to roughen the surface to Rz 10 μm.

(Run No. 9)

The following surface treatment was performed on a threaded joint for pipes made of the high alloy steel having composition D shown in Table 1.

The box surface, which had been finished by machine grinding was subjected to Ni strike plating and then Cu—Sn—Zn alloy plating, both by electroplating, to form a plated coating having a total thickness of 7 μm. Atop the plated surface which had an Rz of 2 μm, a lubricating coating having the composition of Run No. 9 shown in Table 6 and a thickness of 40 μm was formed by the heating method. On the pin surface, the same lubricating coating having a thickness of 40 μm was formed in the same manner as for the box surface after sand blasting to roughen the surface to Rz 10 μm.

(Control Run)

The Control Run was the same as in Example 1 (using compound grease).

(Run No. 10—Comparative)

The following surface treatment was performed on a threaded joint for pipes made of the Cr—Mo steel having composition B shown in Table 1.

On the box surface, which had been finished by machine grinding, a manganese phosphate coating with a thickness of 12 μm (Rz: 10 μm) was formed, and then a lubricating coating having the composition of Run No. 10 shown in Table 6 and a thickness of 40 μm was formed by the solvent method. On the pin surface, which had been finished by machine grinding, the same lubricating coating as was formed on the box surface was formed.

(Run No. 11—Comparative)

This run was the same as Run No. 10 except that the composition of the lubricating coating was changed so as to have the composition of Run No. 11 shown in Table 6.

(Run No. 12—Comparative)

The following surface treatment was performed on a threaded joint for pipes made of the carbon steel having composition A shown in Table 1.

On the box surface, which had been finished by machine grinding, a manganese phosphate coating with a thickness of 15 μm (Rz: 12 μm) was formed, and then a lubricating coating having the composition of Run No. 12 shown in Table 6 and a thickness of 40 μm was formed by the above-described heating method. On the pin surface, which had been finished by machine grinding, the same lubricating coating as was formed on the box surface was formed.

As shown in Table 7, in Runs Nos. 1-9 according to the present invention, even when slight galling occurred during ten cycles of the make-up and break-out test, by performing repair, make-up and break-out could be performed through the tenth cycle. This result is of a level having no problems with respect to galling resistance. Slight galling tends to occur earlier with a threaded joint for pipes made of 13Cr steel or a high alloy steel, which are more susceptible to galling.

The relative values of ΔT in the high-torque make-up test compared to that obtained in the Control where the compound grease was used were at least 95% in all of Runs Nos. 1-9. Thus, it can be seen that the lubricating coatings formed in accordance with the present invention have a large ΔT which is comparable to or larger than that of compound grease, and yielding of the unthreaded metal contact portions does not readily occur even if make-up is carried out with a high torque.

In Runs Nos. 10-12 which are comparative examples, either the value of ΔT or galling resistance was insufficient.

The anticorrosive properties which are demanded of a threaded joint for pipes were tested in the same manner as described in Example 1. It was confirmed by this test that there was no occurrence of rust for any of Runs Nos. 1 to 9.

Example 3

This example illustrates lubricating coatings which contain magnesium carbonate as an optional element. The material and size of the threaded joint for pipes tested in this example were the same as those used in Example 1. The type of preparatory surface treatment applied to and the composition of the lubricating coating formed on the pin and box surfaces in each run are shown in Tables 8 and 9, respectively.

When the solvent method was employed to form a lubricating coating, the amount of a solvent which was used was 20 parts by mass. The formation of a lubricating coating by the heating method was carried out in the same manner as in Example 2 (by heating the coating composition and the surface to be coated to 130° C. and using a spray gun equipped with a heat retaining means).

The threaded joint for pipes were subjected to a repeated make-up and break-out test and a high torque test in the same manner as described in Example 2. The test results are shown in Table 10. In Table 10, the ratio in % of Ts determined in the high torque test to the optimal make-up torque (20 kN-m) in each run is also shown.

TABLE 8

Preparatory sruface treatment and lubricating coating

| Run No. | Steel | Preparatory surface treatment Box | Pin | Method | Lubricating coating Thickness (μm) Box | Pin |
|---|---|---|---|---|---|---|
| 1~6 | B | 1. Grinding (R = 3) 2. Mn phosphating (R = 10) (t = 12) | 1. Grinding (R = 3) 2. Zn phosphating (R = 8) (t = 12) | Solvent | 30~55 | 30~50 |
| 7 | C | 1. Grinding (R = 3) 2. Ni strike plating + Cu plating (t = 12) (R = 3) | Sand blasting (R = 10) | Heating | 44 | 27 |
| 8 | D | 1. Grinding (R = 3) 2. Ni strike plating + Cu—Sn—Zn alloy plating (t = 7) (R = 2) | Sand blasting (R = 10) | Heating | 40 | 34 |
| 9, 10 | A | 1. Grinding (R = 3) 2. Mn phosphating (R = 12) (t = 15) | 1. Grinding (R = 3) 2. Zn phosphating (R = 10) (t = 15) | Heating | 37~40 | 40~42 |
| Control | A | 1. Grinding (R = 3) 2. Mn phosphating (R = 12) (t = 15) | Grinding (R = 3) | Compound grease | | |
| 11 | B | 1. Grinding (R = 3) 2. Mn phosphating (R = 10) (t = 12) | Grinding (R = 3) | Heating | 30 | 28 |
| 12 | B | 1. Grinding (R = 3) 2. Mn phosphating (R = 10) (t = 12) | Grinding (R = 3) | Solvent | 40 | 40 |
| 13 | A | 1. Grinding (R = 3) 2. Mn phosphating (R = 12) (t = 15) | Grinding (R = 3) | Solvent | 32 | 34 |

R: Surface roughness Rz (μm),
t: Thickness (μm)

TABLE 9

Lubricating coating composition on solids basis (mass %)

| Run No. | Mg carbonate | Rosin | Wax | Metal soap | Lubricating powder | Basic metal salt of an aromatic organid acid | Others |
|---|---|---|---|---|---|---|---|
| 1 | 1 | 5 | Paraffin wax (10) | Ca stearate (15) | Graphite (6) | Basic Ca sulfonate (Rem) | None |
| 2 | 4 | 10 | Paraffin wax (10) | Ca stearate (15) | Graphite (6) | Basic Ca sulfonate (Rem) | None |
| 3 | 10 | 20 | Paraffin wax (10) | Ca stearate (15) | Graphite (6) | Basic Ca sulfonate (Rem) | None |
| 4 | 2 | 20 | Paraffin wax (10) | Ca stearate (15) | Graphite (6) | Basic Ca carboxylate (Rem) | None |
| 5 | 10 | 10 | Paraffin wax (10) | Ca stearate (15) | Graphite (6) | Basic Ca phenate (Rem) | None |
| 6 | 20 | 10 | Paraffin wax (10) | Ca stearate (15) | Graphite (6) | Basic Ca Salicylate (Rem) | None |
| 7 | 30 | 3 | Carnauba wax (15) Polyethylene wax (10) | Zn stearate (15) | Graphite fluoride (4) | Basic Ca sulfonate (Rem) | None |
| 8 | 10 | 20 | Carnauba wax (15) Polyethylene wax (10) | Zn stearate (15) | $MoS_2$ (5) PTFE (1) | Basic Ca sulfonate (Rem) | None |
| 9 | 0.5 | 15 | Carnauba wax (15) Polyethylene wax (10) | Zn stearate (15) | $WS_2$ (5) BN (1) | Basic Ca sulfonate (Rem) | None |
| 10 | 10 | 0.5 | Carnauba wax (15) Polyethylene wax (10) | Zn stearate (15) | $WS_2$ (5) BN (1) | Basic Ca sulfonate (Rem) | None |
| Control | Compound grease as specified in API BUL 5A2 | | | | | | |
| 11 | 0 | 0 | Paraffin wax (10) | Ca stearate (15) | Graphite (6) | Basic Ca sulfonate (Rem) | TiO, ZnO, $Bi_2O_3$ (total 11) |
| 12 | 0 | 5 | Paraffin wax (10) | Ca stearate (15) | Graphite (6) | Basic Ca sulfonate (Rem) | None |
| 13 | 10 | 0 | Carnauba wax (15) Polyethylene wax (10) | Zn stearate (15) | Graphite fluoride (4) | Basic Ca sulfonate (Rem) | None |

TABLE 10

| Run No. | Occurrence of galling [1] (Number: make-up cycle) | | | | | | | | | | Ts [2] (%) | ΔT [3] |
|---|---|---|---|---|---|---|---|---|---|---|---|---|
| | 1 | 2 | 3 | 4 | 5 | 6 | 7 | 8 | 9 | 10 | | |
| 1 | ○ | ○ | ○ | ○ | ○ | ○ | ○ | ○ | ○ | ○ | 36 | 100 |
| 2 | ○ | ○ | ○ | ○ | ○ | ○ | ○ | ○ | ○ | ○ | 32 | 105 |
| 3 | ○ | ○ | ○ | ○ | ○ | ○ | ○ | ○ | ○ | ○ | 31 | 130 |
| 4 | ○ | ○ | ○ | ○ | ○ | ○ | ○ | ○ | ○ | ○ | 36 | 108 |
| 5 | ○ | ○ | ○ | ○ | ○ | ○ | ○ | ○ | ○ | ○ | 30 | 115 |
| 6 | ○ | ○ | ○ | ○ | ○ | ○ | ○ | ○ | ○ | ○ | 25 | 121 |
| 7 | ○ | ○ | ○ | ○ | ○ | ○ | ○ | ○ | ○ | Δ | 21 | 100 |
| 8 | ○ | ○ | ○ | ○ | ○ | ○ | ○ | Δ | Δ | Δ | 28 | 128 |
| 9 | ○ | ○ | ○ | ○ | ○ | ○ | ○ | ○ | Δ | Δ | 38 | 96 |
| 10 | ○ | ○ | ○ | ○ | ○ | ○ | ○ | ○ | ○ | ○ | 27 | 95 |
| Control | ○ | ○ | ○ | ○ | ○ | ○ | ○ | ○ | ○ | ○ | 30 | 100 |
| 11 | ○ | ○ | ○ | ○ | ○ | ○ | ○ | ○ | ○ | ○ | 32 | 65 |
| 12 | ○ | ○ | ○ | ○ | ○ | ○ | ○ | Δ | Δ | Δ | 42 | 80 |
| 13 | ○ | ○ | ○ | ○ | ○ | ○ | ○ | ○ | ○ | ○ | 27 | 60 |

(Note)
[1] ○: No occurrence of galling
Δ: Occurrence of slight galling (capable of continuing make-up after repair)
x: Occurrence of severe galling (unrepairable)
—: Test terminated
[2] Ratio (%) of Ts to the optimum make-up torque
[3] ΔT(=Ty − Ts) (Relative value when ΔT in Control is 100)

(Runs Nos. 1-6)

The following surface treatment was performed on a threaded joint for pipes made of the Cr—Mo steel having composition B shown in Table 1.

On the box surface, which had been finished by machine grinding, a manganese phosphate coating with a thickness of 12 μm (Rz: 10 μm) was formed, and then a lubricating coating having the composition shown in Table 9 was formed by the solvent method.

On the pin surface, which had been finished by machine grinding, a zinc phosphate coating with a thickness of 12 μm (Rz: 8 μm) was formed, and then the same lubricating coating as was formed on the box surface was formed.

The thickness of the lubricating coating formed was as follows:

Run No. 1—box: 40 μm; pin: 42 μm;
Run No. 2—box: 42 μm; pin: 45 μm;
Run No. 3—box: 50 μm; pin: 46 μm;
Run No. 4—box: 30 μm; pin: 40 μm;
Run No. 5—box: 55 μm; pin: 50 μm; and
Run No. 6—box: 30 μm; pin: 32 μm.

(Run No. 7)

The following surface treatment was performed on a threaded joint for pipes made of the 13% Cr steel having composition C shown in Table 1.

The box surface, which had been finished by machine grinding was subjected to Ni strike plating and then Cu plating, both by electroplating, to form a plated coating having a total thickness of 12 μm. Atop the plated surface which had an Rz of 3 μm, a lubricating coating having the composition of Run No. 7 shown in Table 9 and a thickness of 44 μm was formed by the above-described heating method. On the pin surface, the same lubricating coating with a thickness of 27 μm was formed in the same manner as for the box surface after sand blasting to roughen the surface to Rz 10 μm.

(Run No. 8)

The following surface treatment was performed on a threaded joint for pipes made of the high alloy steel having composition D shown in Table 1.

The box surface, which had been finished by machine grinding was subjected to Ni strike plating and then Cu—Sn—Zn alloy plating, both by electroplating, to form a plated coating having a total thickness of 7 μm. Atop the plated surface which had an Rz of 2 μm, a lubricating coating having the composition of Run No. 8 shown in Table 9 and a thickness of 40 μm was formed by the heating method. On the pin surface, the same lubricating coating having a thickness of 34 μm was formed in the same manner as for the box surface after sand blasting to roughen the surface to Rz 10 μm.

(Run No. 9)

The following surface treatment was performed on a threaded joint for pipes made of the carbon steel having composition A shown in Table 1.

On the box surface, which had been finished by machine grinding, a manganese phosphate coating with a thickness of 15 μm (Rz: 12 μm) was formed, and then a lubricating coating having the composition of Run No. 9 shown in Table 9 and a thickness of 37 μm was formed by the heating method. On the pin surface, which had been finished by machine grinding, a zinc phosphate coating with a thickness of 15 μm (Rz: 12 μm) was formed, and then a lubricating coating having a thickness of 40 μm was formed in the same manner as employed on the box surface.

(Run No. 10)

This run was the same as Run No. 9 except that the thickness of the lubricating coating was 40 μm on the box surface and 42 μm on the pin surface.

(Control Run)

The Control Run was the same as in Example 1 (using compound grease).

(Run No. 11—Comparative)

The following surface treatment was performed on a threaded joint for pipes made of the Cr—Mo steel having composition B shown in Table 1.

On the box surface, which had been finished by machine grinding, a manganese phosphate coating with a thickness of 12 μm (Rz: 10 μm) was formed, and then a lubricating coating having the composition of Run No. 11 shown in Table 9 and a thickness of 40 μm was formed by the heating method. On the pin surface, which had been finished by machine grinding, the same lubricating coating as was formed on the box surface was formed.

(Run No. 12—Comparative)

The following surface treatment was performed on a threaded joint for pipes made of the Cr—Mo steel having composition B shown in Table 1.

On the box surface, which had been finished by machine grinding, a manganese phosphate coating with a thickness of 12 μm (Rz: 10 μm) was formed, and then a lubricating coating having the composition of Run No. 12 shown in Table 9 and a thickness of 40 μm was formed by the solvent method. On the pin surface, which had been finished by machine grinding, the same lubricating coating as was formed on the box surface was formed.

(Run No. 13—Comparative)

The following surface treatment was performed on a threaded joint for pipes made of the carbon steel having composition A shown in Table 1.

On the box surface, which had been finished by machine grinding, a manganese phosphate coating with a thickness of 15 μm (Rz: 12 μm) was formed, and then a lubricating coating having the composition of Run No. 13 shown in Table 9 and a thickness of 32 μm was formed by the solvent method. On the pin surface, which had been finished by machine grinding, a lubricating coating having a thickness of 34 μm was formed in the same manner as in the box surface.

As shown in Table 10, in Runs Nos. 1-10 according to the present invention, even when slight galling occurred during ten cycles of the make-up and break-out test, by performing repair, make-up and break-out could be performed through the tenth cycle. This result is of a level having no problems with respect to galling resistance. Slight galling tends to occur earlier with a threaded joint for pipes made of 13Cr steel or a high alloy steel, which are more susceptible to galling.

The relative values of ΔT in the high-torque make-up test compared to that obtained in the Control where the compound grease was used were at least 95% in all of Runs Nos. 1-10. Thus, it can be seen that the lubricating coatings formed in accordance with the present invention have a large ΔT which is comparable to or larger than that of compound grease and that yielding of the unthreaded metal contact portions does not readily occur even if make-up is carried out with a high torque.

In Runs Nos. 11-13 which are comparative examples, either the value of ΔT or galling resistance was insufficient.

The anticorrosive properties which are demanded of a threaded joint for pipes were tested in the same manner as described in Example 1. It was confirmed by this test that there was no occurrence of rust for any of Runs Nos. 1 to 10.

Example 4

This example illustrates lubricating coatings which contain a carbohydrate. The material and size of the threaded joint for pipes used in this example for testing were the same in Example 1. The type of preparatory surface treatment applied to and the composition of the lubricating coating formed on the pin and box surfaces in each run are shown in Tables 11 and 12, respectively.

When the solvent method was employed to form a lubricating coating, the amount of a solvent which was used was 30 parts by mass. The formation of a lubricating coating by the heating method was carried out in the same manner as in Example 2 (by heating the coating composition and the surface to be coated to 130° C. and using a spray gun equipped with a heat retaining means).

The threaded joint for pipes were subjected to a repeated make-up and break-out test and a high torque test in the same manner as described in Example 2. The test results are shown in Table 13. In Table 13, the ratio in % of Ts determined in the high torque test to the optimal make-up torque (20 kN-m) in each run is also shown.

TABLE 11

Preparatory surface treatment and lubricating coating

| Run No. | Steel | Preparatory surface treatment Box | Pin | Lubricating coating Method | Thickness (μm) Box | Pin |
|---|---|---|---|---|---|---|
| 1 | A | 1. Grinding (R = 3) | 1. Grinding (R = 3) | Solvent | 50 | 50 |
| 4 |   | 2. Mn phosphating (R = 10) (t = 12) | 2. Zn phosphating (R = 8) (t = 12) | Heating |   |   |
| 2 | C | 1. Grinding (R = 3) | Sand blasting (R = 10) | Solvent | 52 | 50 |
| 5 |   | 2. Ni strike plating + Cu plating (t = 12) (R = 3) |   | Heating | 80 |   |
| 3 | B | 1. Grinding (R = 3) | 1. Grinding (R = 3) | Solvent | 100 | 100 |
| 6 |   | 2. Ni strike plating + Cu—Sn—Zn 合金 plating (t = 8) (R = 2) | 2. Zn phosphating (R = 8) (t = 12) | Heating | 40 | 40 |
| Control | A | 1. Grinding (R = 3) 2. Mn phosphating (R = 12) (t = 15) | 1. Grinding (R = 3) 2. Zn phosphating (R = 8) (t = 12) | Compound grease |   |   |
| 7 | B | 1. Grinding (R = 3) 2. Mn phosphating (R = 10) (t = 12) | 1. Grinding (R = 3) 2. Zn phosphating (R = 8) (t = 12) | Solvent | 80 | 80 |
| 8 | A | 1. Grinding (R = 3) 2. Mn phosphating (R = 12) (t = 15) | 1. Grinding (R = 3) 2. Zn phosphating (R = 8) (t = 12) | Heating | 50 | 50 |

R: Surface roughness Rz (μm),
t: Thickness (μm)

TABLE 12

Lubricating coating composition on solids basis (mass %)

| Run No. | Rosin | CaF$_2$ | Carbohydrate[1] | Wax | Metal soap | Basic metal salt of an aromatic acid | Lubricating powder |
|---|---|---|---|---|---|---|---|
| 1 | 15 | 10 | β-CD(10) | Paraffin wax (8) | Ca stearate (15) | Basic Ca sulfonate (42) | None |
| 2 | 14 | 9 | β-CD(9) | Paraffin wax (8) | Ca stearate (14) | Basic Ca sulfonate (40) | Graphite (6) |
| 3 | 15 | 9 | β-CD(9) | Paraffin wax (8) | Ca stearate (14) | Basic Ca sulfonate (42) | Cryolite (3) |
| 4 | 15 | 10 | β-CD(10) | Paraffin wax (8) | Ca stearate (15) | Basic Ca sulfonate (42) | None |
| 5 | 10 | 10 | CD(10) | Carnauba wax (5) Polyethylene wax (10) | Zn stearate (15) | Basic Ca sulfonate (35) | Graphite fluoride (5) |
| 6 | 10 | 10 | CD(10) | Carnauba wax (5) Polyethylene wax (10) | Zn stearate (15) | Basic Ca sulfonate (34) | MoS$_2$ (5) PTFE (1) |
| Control |   |   |   | Compound grease as specified in API BUL 5A2 |   |   |   |
| 7 | None | None | None | Paraffin wax (12) | Ca stearate (23) | Basic Ca sulfonate (65) | None |
| 8 | None | None | None | Paraffin wax (12) | Ca stearate (23) | Basic Ca sulfonate (60) | Graphite (6) |

[1] CD = Cyclodextrin

TABLE 13

| Run No. | Occurrence of galling [1] (Number: make-up cycle) | | | | | | | | | | Ts [2] (%) | ΔT [3] |
|---|---|---|---|---|---|---|---|---|---|---|---|---|
| | 1 | 2 | 3 | 4 | 5 | 6 | 7 | 8 | 9 | 10 | | |
| 1 | ○ | ○ | ○ | ○ | ○ | ○ | ○ | ○ | ○ | ○ | 36 | 122 |
| 2 | ○ | ○ | ○ | ○ | ○ | ○ | ○ | ○ | ○ | ○ | 32 | 103 |
| 3 | ○ | ○ | ○ | ○ | ○ | ○ | ○ | ○ | ○ | ○ | 28 | 107 |
| 4 | ○ | ○ | ○ | ○ | ○ | ○ | ○ | ○ | ○ | ○ | 35 | 118 |
| 5 | ○ | ○ | ○ | ○ | ○ | ○ | ○ | ○ | ○ | ○ | 30 | 105 |
| 6 | ○ | ○ | ○ | ○ | ○ | ○ | ○ | ○ | ○ | ○ | 25 | 96 |
| Control | ○ | ○ | ○ | ○ | ○ | ○ | ○ | ○ | ○ | ○ | 30 | 100 |
| 7 | ○ | ○ | ○ | ○ | ○ | ○ | ○ | ○ | ○ | ○ | 27 | 50 |
| 8 | ○ | ○ | ○ | ○ | ○ | ○ | ○ | ○ | ○ | ○ | 30 | 55 |

(Note)
[1] ○: No occurrence of galling
Δ: Occurrence of slight galling (capable of continuing make-up after repair)
x: Occurrence of severe galling (unrepairable)
—: Test terminated
[2] Ratio (%) of Ts to the optimum make-up torque
[3] ΔT(=Ty − Ts) (Relative value when ΔT in Control is 100)

(Run No. 1)

The following surface treatment was performed on a threaded joint for pipes made of the carbon steel having composition A shown in Table 1.

On the box surface, which had been finished by machine grinding, a manganese phosphate coating with a thickness of 12 μm (Rz: 10 μm) was formed, and then a lubricating coating having the composition of Run No. 1 shown in Table 12 and a thickness of 50 μm was formed by the solvent method. On the pin surface, which had been finished by machine grinding, a zinc phosphate coating with a thickness of 12 μm (Rz: 8 μm) was formed, and then the same lubricating coating as was formed on the box surface was formed.

(Run No. 2)

The following surface treatment was performed on a threaded joint for pipes made of the 13% Cr steel having composition C shown in Table 1.

The box surface, which had been finished by machine grinding was subjected to Ni strike plating (1 μm) and then Cu plating (11 μm), both by electroplating, to form a plated coating having a total thickness of 12 μm. Atop the plated surface which had an Rz of 3 μm, a lubricating coating having the composition of Run No. 2 shown in Table 12 and a thickness of 52 μm was formed by the above-described solvent method. On the pin surface, the same lubricating coating with a thickness of 50 μm was formed in the same manner as for the box surface after sand blasting to roughen the surface to Rz 10 μm.

(Run No. 3)

The following surface treatment was performed on a threaded joint for pipes made of the Cr—Mo steel having composition D shown in Table 1.

The box surface, which had been finished by machine grinding was subjected to Ni strike plating (1 μm) and then Cu—Sn—Zn alloy plating (7 μm), both by electroplating, to form a plated coating having a total thickness of 8 μm. Atop the plated surface which had an Rz of 2 μm, a lubricating coating having the composition of Run No. 3 shown in Table 12 and a thickness of 100 μm was formed by the solvent method. On the pin surface, which had been finished by machine grinding, a zinc phosphate coating with a thickness of 12 μm (Rz: 8 μm) was formed, and then the same lubricating coating as was formed on the box surface was formed.

(Run No. 4)

This run was the same as Run No. 1 except that a lubricating coating was formed by the heating method and its thickness was 50 μm on both the pin and the box surfaces.

(Run No. 5)

This run was the same as Run No. 2 except that a lubricating coating was formed by the heating method and its thickness was 80 μm on the pin surface and 50 μm on the box surface.

(Run No. 6)

This run was the same as Run No. 3 except that a lubricating coating was formed by the heating method and its thickness was 40 μm on both the pin and the box surfaces.

(Control Run)

The Control Run was the same as in Example 1 (using compound grease).

(Run No. 7—Comparative)

The following surface treatment was performed on a threaded joint for pipes made of the Cr—Mo steel having composition B shown in Table 1.

On the box surface, which had been finished by machine grinding, a manganese phosphate coating with a thickness of 12 μm (Rz: 10 μm) was formed, and then a lubricating coating having the composition of Run No. 7 shown in Table 12 and a thickness of 80 μm was formed by the solvent method. On the pin surface, which had been finished by machine grinding, the same lubricating coating as was formed on the box surface was formed.

(Run No. 8—Comparative)

The following surface treatment was performed on a threaded joint for pipes made of the carbon steel having composition A shown in Table 1.

On the box surface, which had been finished by machine grinding, a manganese phosphate coating with a thickness of 15 μm (Rz: 12 μm) was formed, and then a lubricating coating having the composition of Run No. 8 shown in Table 12 and a thickness of 50 μm was formed by the heating method. On the pin surface, which had been finished by machine grinding, the same lubricating coating as was formed on the box surface was formed.

As shown in Table 13, in Runs Nos. 1-6 according to the present invention, galling resistance was very good as demonstrated by no occurrence of galling during ten cycles of the make-up and break-out test. The relative values of ΔT in the high-torque make-up test were at least 95% in all these runs, and it exceeded 100% in all runs except one. Thus, it can be seen that the lubricating coatings formed in accordance with the present invention have a large ΔT which is comparable to or larger than that of compound grease, and yielding of the unthreaded metal contact portions does not readily occur even if make-up is carried out with a high torque.

In Runs Nos. 7 and 8 which are comparative examples, the values of ΔT were very small, so if these threaded joint for pipes are made up with a high torque, yielding of the unthreaded metal contact portions may readily occur.

The anticorrosive properties which are demanded of a threaded joint for pipes were tested in the same manner as described in Example 1. It was confirmed by this test that there was no occurrence of rust for any of Runs Nos. 1 to 6.

The present invention has been described above with respect to embodiments which are considered to be preferred at the present time, but the present invention is not limited to the embodiments disclosed above. It is possible to make changes to an extent which is not contrary to the technical concept of the invention as understood from the claims and the specification as a whole, and a threaded joint for pipes to employing such variations should be understood as being encompassed by the technical scope of the present invention.

The invention claimed is:

1. A threaded joint for pipes used in the excavation of oil wells and gas wells without using a lubricating grease constituted by a pin and a box each having a contact surface comprising a threaded portion and an unthreaded metal contact portion, characterized in that the contact surface of at least one of the pin and the box has a lubricating coating formed using a composition which comprises a total of 1-30% of one or both of a rosin and calcium fluoride, 2-30% of metal soap, 2-30% of wax, and 10-70% of a basic metal salt of an aromatic organic acid as expressed in mass % based on the total amount of non-volatile components in the composition and further contains substantially no harmful heavy metals, wherein a relative value of $\Delta T$ is 90 or more when $\Delta T$ in control is 100, wherein $\Delta T=Ty-Ts$, and Ts represents torque at a beginning of shoulder interference when the threaded joint is formed by turns of the pipe, and Ty represents torque when plastic deformation of the shoulder of the threaded joint begins during rotation, and $\Delta T$ in control is a value obtained with a compound grease.

2. The threaded joint for pipes as set forth in claim 1 which further includes a lubricating powder.

3. The threaded joint for pipes as set forth in claim 2 which contains 0.5-20% of a lubricating powder as expressed in mass % based on the total amount of non-volatile components in the composition.

4. The threaded joint for pipes as set forth in claim 2 wherein the lubricating powder is a powder of graphite.

5. The threaded joint for pipes as set forth in claim 4, wherein the graphite is an amorphous graphite having an ash content of 0.2-5.5 mass % and a crystallinity of at most 98%.

6. The threaded joint for pipes as set forth in claim 1 which further includes magnesium carbonate.

7. The threaded joint for pipes as set forth in claim 6 which contains 0.5-30% of magnesium carbonate as expressed in mass % based on the total amount of non-volatile components in the composition.

8. The threaded joint for pipes as set forth in claim 1 which further includes a carbohydrate.

9. The threaded joint for pipes as set forth in claim 8 wherein the carbohydrate is selected from dextrins including cyclodextrins, and its content is 0.5-20% as expressed in mass % based on the total amount of non-volatile components in the composition.

10. The threaded joint for pipes as set forth in claim 1 which further includes a volatile organic solvent.

11. A threaded joint for pipes as set forth in claim 1, wherein the lubricating coating has a thickness of 10-500 μm.

12. A threaded joint for pipes as set forth in claim 1, wherein the contact surface having the solid lubricating coating has been surface treated prior to the formation of the lubricating coating thereon by a method selected from blasting treatment, pickling, phosphate chemical conversion treatment, oxalate chemical conversion treatment, borate chemical conversion treatment, electroplating, impact plating, and a combination of these.

13. A threaded joint for pipes as set forth in claim 1, wherein only one of the pin and the box has the lubricating coating on its contact surface, and the contact surface of the other member is surface treated by a method selected from blasting, pickling, phosphate chemical conversion treatment, oxalate chemical conversion treatment, borate chemical conversion treatment, electroplating, impact plating, and a combination of these.

14. A threaded joint for pipes as set forth in claim 1, which is for use in connecting oil country tubular goods.

15. A method of connecting a plurality of oil country tubular goods using a threaded joint for pipes as set forth in claim 1 without application of a lubricating grease.

* * * * *